US010889732B2

(12) United States Patent
Ren et al.

(10) Patent No.: US 10,889,732 B2
(45) Date of Patent: Jan. 12, 2021

(54) MONOCHROMATIC ACTINIC RADIATION CURABLE COATINGS FOR OPTICAL FIBER

(71) Applicant: DSM IP ASSETS B.V., Heerlen (NL)

(72) Inventors: Kangtai Ren, Geneva, IL (US); Huimin Cao, Addison, IL (US); Wendell Wayne Cattron, Elgin, IL (US)

(73) Assignee: DSM IP ASSETS B.V., Heerlen (NL)

( * ) Notice: Subject to any disclaimer, the term of this patent is extended or adjusted under 35 U.S.C. 154(b) by 640 days.

(21) Appl. No.: 15/329,633

(22) PCT Filed: Aug. 17, 2015

(86) PCT No.: PCT/US2015/045475
§ 371 (c)(1),
(2) Date: Aug. 8, 2017

(87) PCT Pub. No.: WO2016/028668
PCT Pub. Date: Feb. 25, 2016

(65) Prior Publication Data
US 2018/0163075 A1 Jun. 14, 2018

Related U.S. Application Data

(60) Provisional application No. 62/142,217, filed on Apr. 2, 2015, provisional application No. 62/056,594, filed (Continued)

(51) Int. Cl.
*C03C 25/285* (2018.01)
*C09D 133/10* (2006.01)
*C09D 4/00* (2006.01)
(Continued)

(52) U.S. Cl.
CPC ........ *C09D 133/10* (2013.01); *C03C 25/1065* (2013.01); *C03C 25/26* (2013.01);
(Continued)

(58) Field of Classification Search
CPC ... C09D 133/10; C03C 25/1065; C03C 25/26; C03C 25/326; C03C 25/285; C08F 2/48
See application file for complete search history.

(56) References Cited

U.S. PATENT DOCUMENTS 6,187,835 B1 * 2/2001 Szum ................... C03C 25/106
428/30
7,173,072 B2 2/2007 Itai et al.
(Continued)

FOREIGN PATENT DOCUMENTS

CN 102482145 B 8/2016
EP 1765878 8/2010
(Continued)

OTHER PUBLICATIONS

International Search Report dated Nov. 10, 2015.

*Primary Examiner* — Elizabeth A Burkhart
(74) *Attorney, Agent, or Firm* — Daniel S. Bujas

(57) ABSTRACT

Described herein is a method for coating optical fiber where the coating has been cured by application of a source of monochromatic actinic radiation, such as a light emitting diode, wherein the coating contains a urethane(meth)acrylate oligomer; a (meth)acrylate diluent monomer; a diluent monomer having an electron donating group adjacent to the vinyl group, such as a vinyl ether monomer; and a photoinitiator. Also described are compositions which are capable of undergoing photopolymerization when coated on an optical fiber and when irradiated by a light emitting diode (LED) with improved surface cure and reduced yellowing. Also described are the coated optical fibers produced by such processes and compositions.

20 Claims, 4 Drawing Sheets

Related U.S. Application Data on Sep. 28, 2014, provisional application No. 62/056,592, filed on Sep. 28, 2014, provisional application No. 62/038,357, filed on Aug. 17, 2014.

(51) Int. Cl.

| | |
|---|---|
| *C03C 25/26* | (2018.01) |
| *C03C 25/1065* | (2018.01) |
| *C03C 25/326* | (2018.01) |
| *C08F 2/48* | (2006.01) |
| *C08F 222/10* | (2006.01) |
| *C08L 75/14* | (2006.01) |
| *C08F 216/12* | (2006.01) |

(52) U.S. Cl.
CPC .......... *C03C 25/285* (2013.01); *C03C 25/326* (2013.01); *C08F 2/48* (2013.01); *C08F 222/1006* (2013.01); *C08L 75/14* (2013.01); *C09D 4/00* (2013.01); *C08F 216/125* (2013.01); *C08F 222/102* (2020.02); *C08F 222/1065* (2020.02)

(56) References Cited

U.S. PATENT DOCUMENTS

| | | | |
|---|---|---|---|
| 2005/0032927 A1* | 2/2005 | Itai | ........................ C08F 220/18 522/182 |
| 2007/0191505 A1* | 8/2007 | Takahashi | ............ C08G 18/672 522/178 |
| 2012/0129969 A1 | 5/2012 | Bishop et al. | |
| 2012/0196122 A1* | 8/2012 | Bishop | .................. C03C 25/106 428/392 |
| 2012/0321270 A1 | 12/2012 | Imai et al. | |
| 2014/0106082 A1 | 4/2014 | Cattron et al. | |

FOREIGN PATENT DOCUMENTS

| | | |
|---|---|---|
| JP | 407069686 | 3/1995 |
| JP | 2003530294 A | 10/2003 |
| WO | WO0177040 A3 | 3/2002 |
| WO | WO2011075549 A1 | 6/2011 |
| WO | WO2012003106 A8 | 8/2012 |

\* cited by examiner

Section A-A

MONOCHROMATIC ACTINIC RADIATION CURABLE COATINGS FOR OPTICAL FIBER

CROSS REFERENCE TO RELATED APPLICATIONS

This application is the U.S. national phase of International Application No. PCT/US2015/45475 filed 17 Aug. 2015, which designated the US and claims priority to U.S. Provisional Patent Application No. 62/038,357 filed Aug. 17, 2014, U.S. Provisional Application No. 62/142,217 filed Apr. 2, 2015, U.S. Provisional Application No. 62/056,592 filed Sep. 28, 2014, and U.S. Provisional Application No. 62/056,594 filed Sep. 28, 2014, the entire contents of which are hereby incorporated by reference.

TECHNICAL FIELD

The present invention relates generally to methods of coating optical fibers, and the radiation curable secondary coatings suitable for use on optical fibers that are manufactured using monochromatic lamps.

BACKGROUND

Optical fibers are frequently coated with two or more superposed radiation-curable coatings immediately after the fiber is produced by drawing. The coating which directly contacts the optical fiber is called the "inner Primary Coating" and an overlaying coating is called the "outer Primary Coating." In some references, the inner Primary Coating is also called simply the "Primary Coating" and the outer Primary Coating is called a "Secondary Coating." Inner Primary Coatings are of significantly lower modulus than Secondary Coatings.

The relatively soft inner Primary Coating provides resistance to microbending which results in added attenuation of the signal transmission of the coated optical fiber and is therefore undesirable. Microbends are microscopic curvatures in the optical fiber involving local axial displacements of a few micrometers and spatial wavelengths of a few millimeters. Microbends can be induced by thermal stresses and/or mechanical lateral forces. Coatings can provide lateral force protection that protect the optical fiber from microbending, but as coating diameter decreases the amount of protection provided decreases. The relationship between coatings and protection from lateral stress that leads to microbending is discussed, for example, in D. Gloge, "Optical-fiber packaging and its influence on fiber straightness and loss", *Bell System Technical Journal*, Vol. 54, 2, 245 (1975); W. B. Gardner, "Microbending Loss in Optical Fibers", Bell System Technical Journal, Vol. 54, No. 2, p. 457 (1975); T. Yabuta, "Structural Analysis of Jacketed Optical Fibers Under Lateral Pressure", *J. Lightwave Tech.*, Vol. LT-1, No. 4, p. 529 (1983); L. L. Blyler, "Polymer Coatings for Optical Fibers", Chemtech, p. 682 (1987); J. Baldauf, "Relationship of Mechanical Characteristics of Dual Coated Single Mode Optical Fibers and Microbending Loss", *IEICE Trans. Commun.*, Vol. E76-B, No. 4, 352 (1993); and K. Kobayashi, "Study of Microbending Loss in Thin Coated Fibers and Fiber Ribbons", IWCS, 386 (1993). The harder outer Primary Coating, that is, the Secondary Coating, provides resistance to handling forces such as those encountered when the coated fiber is ribboned and/or cabled.

Optical fiber Secondary Coating compositions generally comprise, before cure, a mixture of ethylenically-unsaturated compounds, often consisting of one or more oligomers dissolved or dispersed in liquid ethylenically-unsaturated diluents and photoinitiators. The coating composition is typically applied to the optical fiber in liquid form and then exposed to actinic radiation to effect cure.

In many of these compositions, use is made of a urethane oligomer having reactive termini and a polymer backbone. Further, the compositions generally comprise reactive diluents, photoinitiators to render the compositions UV-curable, and other suitable additives.

Reconsideration of all these components and their combination and composition, however, is required if one changes the energy emitting light source that is used to cure them. Indeed, a substantial change in the output profile (wavelength, energy, reflector configuration, etc) of the UV curing source can have a drastic impact on the final properties of the compositions applied to an optical fiber to the point where they may not cure at all.

The use of ultraviolet mercury arc lamps to emit ultraviolet light suitable to cure radiation curable coatings applied to optical fiber is well known. Ultraviolet arc lamps emit light by using an electric arc to excite mercury that resides inside an inert gas (e.g., Argon) environment to generate ultraviolet light which effectuates curing. Alternatively, microwave energy can also be used to excite mercury lamps in an inert gas medium to generate the ultraviolet light. Throughout this patent application, arc excited and microwave excited mercury lamp, plus various additives (ferrous metal, Gallium, etc.) modified forms of these mercury lamps are identified as mercury lamps.

However, the use of ultraviolet mercury lamps as a radiation source suffers from several disadvantages including environmental concerns from mercury and the generation of ozone as a by-product. Further, mercury lamps typically have lower energy conversion ratio, require warm-up time, generate heat during operation, and consume a large amount of energy when compared with light emitting diodes (LEDs). Furthermore, in the production of coated optical fiber, the heat generated by the UV mercury lamps can negatively impact the liquid coating in that if the coating is not formulated to avoid the presence of volatiles, those volatiles may be vaporized and deposit upon the quartz tube surface, thereby blocking the UV rays from irradiating the liquid coating on the glass fiber. This inhibits the curing of the liquid coating to a solid and increases the frequency and associated cost of equipment maintenance. Accordingly, alternative radiation sources are being investigated.

Light emitting diodes (LEDs) are semiconductor devices which use the phenomenon of electroluminescence to generate light. LEDs consist of a semiconducting material doped with impurities to create a p-n junction capable of emitting light as positive holes join with negative electrons when voltage is applied. The wavelength of emitted light is determined by the materials used in the active region of the semiconductor. Typical materials used in semiconductors of LEDs include, for example, elements from Groups 13 (III) and 15 (V) of the periodic table. These semiconductors are referred to as III-V semiconductors and include, for example, GaAs, GaP, GaAsP, AlGaAs, InGaAsP, AlGaInP, and InGaN semiconductors. Other examples of semiconductors used in LEDs include compounds from Group 14 (IV-IV semiconductor) and Group 12-16 (II-VI). The choice of materials is based on multiple factors including desired wavelength of emission, performance parameters, and cost.

Early LEDs used gallium arsenide (GaAs) to emit infrared (IR) radiation and low intensity red light. Advances in materials science have led to the development of LEDs capable of emitting light with higher intensity and shorter wavelengths, including other colors of visible light, even those emitting UV light. It is possible to create LEDs that emit light anywhere from a minimum wavelength of about 100 nm to a maximum wavelength of about 900 nm. Currently, known LED UV light sources emit light at wavelengths between about 300 and about 475 nm, with 365 nm, 390 nm and 395 nm, 405 nm being common peak spectral outputs. See textbook, "Light-Emitting Diodes" by E. Fred Schubert, 2nd Edition, © E. Fred Schubert 2006, published by Cambridge University Press.

Several manufacturers offer LED lamps for commercial curing applications. For example, Phoseon Technology, Summit UV, Honle UV America, Inc., 1ST Metz GmbH, Jenton International Ltd., Lumios Solutions Ltd., Solid UV Inc., Seoul Optodevice Co., Ltd, Spectronics Corporation, Luminus Devices Inc., and Clearstone Technologies, Heraeus Noblelight and Excelitas Technologies are some of the manufacturers currently offering LED lamps most commonly for curing ink-jet printing compositions, PVC floor coating compositions, metal coating compositions, plastic coating composition, and adhesive compositions.

Over the past few years, UV LED technology has rapidly emerged as a commercial option for UV curing industry. A LED curing system offers substantial benefits over conventional mercury lamps including much lower power consumption, instant on-off capability, longer lamp life, no substrate heating, maintenance free and more environmental sustainability. However, two main drawbacks have limited it to achieve successfully curing performance, such as a typical lower power output from LED lamp than conventional mercury lamps, and the poorer surface cure from LED that traditionally requires the shorter wavelengths of the conventional mercury lamps. Recent evolutionary improvements in these areas have brought us much closer to the expectation of an all LED solution for industrial fiber optical coating curing process. However, even with these higher performance characteristics UV LED lamps do not consistently impart improved cure characteristics into photocurable compositions. UV LED curing systems encounters a primary challenge with the lack of suitable chemistry tailored for the monochromatic wavelengths produced at the longer wavelength UVA region. Existing chemistries of coating materials for optical fiber require reformulation and possibly new raw materials.

Over the past 40 years, most UV chemistry has been formulated to react with broadband mercury spectrums and relies on the shorter wavelengths for surface cure and the longer wavelengths for through cure. Along with the increased demand of optical fiber and market competition, modern optical fiber manufacturing requires the coating material able to be drawn at even higher drawing speed (up to 2500 m/min, and, in the future, maybe even higher to over 2800 m/min or even over 3000 m/min).

Fiber optic coatings are applied using one of two processes: wet-on-wet (WOW) and wet-on-dry (WOD). In the WOD process, the fiber passes first through a primary coating application, which is then UV or UV-LED cured, then passes through a secondary coating application, which is subsequently cured. In the WOW process, the fiber passes through both the primary and secondary coating applications, whereupon the fiber proceeds to UV or UV-LED curing. In a wet-on-wet process, the curing lamps between primary and secondary coating application are omitted.

When LED lamps were installed in fiber drawing towers, and fibers were produced by WOW or WOD processes, it was discovered that known "legacy" coatings exhibited markedly inferior cure performance than that which they had previously demonstrated when cured by conventional microwave lamps. It has been observed that when exposed to LED lamps at the currently industry standard "fast" line speeds of upward of 1500 meters/min, such conventional coating materials on optical fiber may actually begin to cure, but do so at such a slow rate that both primary and secondary coatings suffer an undercuring problem. The undercuring effects are most pronounced at the surface of the secondary coating, i.e., the curing degree on the secondary coating surface is substantially poor, resulting in a tacky coated optical fiber. The cure of primary coatings by WOW process is worse than the one by WOD due to the screening of the light getting to the primary coating by the secondary coating. Therefore, it is not practical to use currently available LED lamps to cure currently available radiation curable coatings for optical fiber.

The undercuring of primary coatings leads to several other undesirable effects in a coated optical fiber, such as poor coating adhesion on fiber with resulting lower fiber strip force (SF), weak mechanical properties (such as weak tensile strength and cavitation strength), and unstable microbending attenuation levels, to name a few.

Similarly, undercured secondary coatings may cause a lower modulus of the protection layer on the fiber, thus resulting in poor mechanical protection. Furthermore, undercured secondary coatings may readily deteriorate at ambient storage conditions because of the low chemical or moisture protection they afford.

When the surface cure of secondary coatings are poor, particularly when the surface cure degree is lower than 80%, a tacky or high friction surface of the coating is generated, thus creating winding and handling problems of the fiber with which they are associated. This potentially leads to broken fibers during the cabling process.

As can be seen, therefore, current radiation curable optical fiber coating compositions are not suitable for curing by LED lamps because heretofore these compositions have been formulated to be cured by mercury lights which produce a different spectral output, namely a "multichromatic" spectral output over several wavelengths (also known as "broadband" spectral output), typically ranging between 200 to 450 nm. The currently available "conventionally curing" UV curable coatings for optical fiber, therefore, may actually begin to cure when exposed to light from an LED light source, but the cure speed is so slow_that these coatings would not cure properly at the currently industry standard "fast" line speeds of upwards of 1500 meters/minute. Consequently the coated fiber cannot achieve full property development and sufficient surface characteristics. Therefore, it is not practical to use currently available LED lamps to cure currently available radiation curable coatings for optical fiber.

A potential approach to solving this undercuring problem is to add higher amounts of photoinitiators to the resins that absorb at the higher wavelength region. However, one potential drawback of this approach is that such photoinitiators typically impart a strong yellow appearance into the cured coating (and therefore also the coated fibers produced therefrom), as these photoinitiators absorb light (at the tail of their absorption range) that encroaches into the visible light region. Another disadvantage of relying on adding high amounts of these photoinitiators to boost the secondary surface cure is the substantial blocking of UV light to the primary layer that also necessarily results. This is especially undesirable for WOW process where the primary has to be cured through the secondary layer. What is needed in the optical fiber art, but what the art seemingly has not yet provided, therefore, is a LED curable composition which provides fast cure speed, and which, upon cure provides good mechanical properties, good optical clarity, and minimal discoloration and yellowing. Without this combination of properties and appearance, a composition cannot meet the stringent industry performance demands when employed in fiber coating processes utilizing monochromatic light sources.

An object of the present invention is to provide a LED curable liquid resin composition having a low viscosity, which is easy to handle in spite of its capability of producing a cured product with a Young's modulus of about 800~2000 MPa, having a high surface curing RAU % (Percentage Reacted Acrylate Unsaturation), having high UV or UV-visible light transmission, capable of producing a cured product with a low yellowness, and superior surface characteristics. Such materials would be useful as a secondary coating material, a matrix material, a bundling material, a color secondary material, an ink, and the like in optical fibers.

BRIEF SUMMARY

The first aspect of the invention is a method of coating an optical fiber comprising the steps of: (a) drawing a glass optical fiber through a draw tower; (b) applying a primary coating composition onto the surface of the glass optical fiber; (c) optionally, exposing the primary coating composition to a first light emitting diode (LED) capable of emitting ultraviolet radiation to affect curing of said primary coating composition; (d) applying a secondary coating composition to the primary coating composition; and (e) exposing the primary coating composition and the secondary coating composition to at least one of the group consisting of the first light emitting diode (LED) and a second light emitting diode (LED) capable of emitting ultraviolet radiation to affect curing of said primary coating composition and said secondary coating composition, to form a cured primary coating on the surface of the optical fiber, and a cured secondary coating on the surface of the cured primary coating; wherein the secondary coating composition comprises (i) from about 5 wt. % to about 20 wt. %, relative to the total weight of the secondary coating composition, of a vinyl ether monomer, wherein the vinyl ether monomer contains a backbone selected from the group consisting of an ethylene oxide, propylene oxide or butylene oxide; (ii) a urethane (meth)acrylate oligomer; and (iii) one or more free-radical photoinitiators.

The second aspect of the claimed invention is a liquid radiation curable composition for coating an optical fiber comprising (a) a component possessing an electron-donating substituent attached to a vinyl group, which is present in an amount from about 0.5 wt. % to about 20 wt. %, relative the total weight of the liquid radiation curable composition; (b) a (meth)acrylate oligomer; (c) a (meth)acrylate diluent monomer; and (d) a free-radical photoinitiator component; wherein the composition is configured to attain a top surface percent reacted acrylate unsaturation (% RAU) of at least about 71%, more preferably at least about 75%, preferably at least about 80% according to an LED DSC method, when said composition is cured by a source of monochromatic actinic radiation with a peak spectral output from about 355 nm to about 420 nm.

The third aspect of the claimed invention is a coated optical fiber produced by the method according to the first aspect of the claimed invention, or from the composition according to the second aspect of the claimed invention.

DETAILED DESCRIPTION

Figure 1:
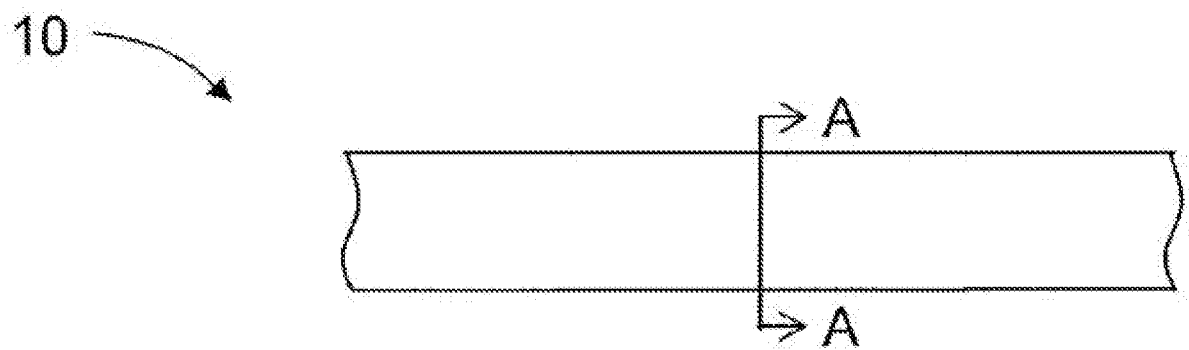
FIG. 1 schematically depicts a cross section of an optical fiber according to embodiments described herein.

A first embodiment of the claimed invention is a method of coating an optical fiber comprising the steps of:
  (a) drawing a glass optical fiber through a draw tower;
  (b) applying a primary coating composition onto the surface of the glass optical fiber;
  (c) optionally, exposing the primary coating composition to a first light emitting diode (LED) capable of emitting ultraviolet radiation to affect curing of said primary coating composition;
  (d) applying a secondary coating composition to the primary coating composition;
  (e) exposing the primary coating composition and the secondary coating composition to at least one of the group consisting of the first light emitting diode (LED) and a second light emitting diode (LED) capable of emitting ultraviolet radiation to affect curing of said primary coating composition and said secondary coating composition, to form a cured primary coating on the surface of the optical fiber, and a cured secondary coating on the surface of the cured primary coating;
  wherein the secondary coating composition comprises:
    i. from about 5 wt. % to about 20 wt. %, relative to the total weight of the secondary coating composition, of a vinyl ether monomer, wherein the vinyl ether monomer contains a backbone selected from the group consisting of an ethylene oxide, propylene oxide or butylene oxide;
    ii. a urethane (meth)acrylate oligomer; and
    iii. one or more free-radical photoinitiators.

The second aspect of the claimed invention is a liquid radiation curable composition for coating an optical fiber comprising:
  (a) a component possessing an electron-donating substituent attached to a vinyl group, which is present in an amount from about 0.5 wt. % to about 20 wt. %, relative the total weight of the liquid radiation curable composition;
  (b) a (meth)acrylate oligomer;
  (c) a (meth)acrylate diluent monomer; and
  (d) a free-radical photoinitiator component;
  wherein the composition is configured to attain
    a top surface percent reacted acrylate unsaturation (% RAU) of at least about 71%, more preferably at least about 75%, preferably at least about 80% according to an LED DSC method, when said composition is cured by a source of monochromatic actinic radiation with a peak spectral output from about 355 nm to about 420 nm.

The third aspect of the claimed invention is a coated optical fiber produced by the method of the first aspect of the claimed invention, or from the composition of the second aspect of the claimed invention.

It is well known to draw glass fibers from a specially prepared, cylindrical preform which has been locally and symmetrically heated to a temperature of, e.g., about 2000° C. As the preform is heated, such as by feeding the preform into and through a furnace, a glass fiber is drawn from the molten material. The primary, intermediate, and secondary coating compositions are applied to the glass fiber after it has been drawn from the preform, preferably immediately after cooling. The coating compositions are then cured to produce the coated optical fiber. The method of curing is preferably carried out by exposing the un-cured coating composition on the glass fiber to ultraviolet light or electron beam. It is frequently advantageous to apply both the several coating compositions in sequence following the draw process. General methods of applying dual layers of coating compositions to a moving glass fiber are well-known in the art, and are disclosed in U.S. Pat. No. 4,474,830 to Taylor and U.S. Pat. No. 4,851,165 to Rennell et al. The problem caused by the use of monochromatic light emitting lamps in these towers, however, will be independent of fiber optic glass design and type and so the solution will be applicable to all different fiber types. Newer fiber design concepts can be found in U.S. Pat. No. 8,837,892, US 2014/0294355, and US 2015/0071595.

As discussed earlier, the concept of substituting monochromatic actinic radiation sources such as light emitting diodes (LEDs) for the traditional broadband UV lamps has recently become known. A more complete description of the design and use of these LED lamps in optical fiber manufacture can be found in U.S. Pat. Nos. 8,604,448 and 8,357,878.

Example configurations for optical fiber manufacture via LED cure are as follows:
1) The number of UV LED lamp systems can vary from 1 to 12, more preferably from 2 to 10, most preferably from 4 to 8.
2) LED lamp systems can have at the central axis target anywhere between a 0.5 W/cm$^2$ to 40 W/cm$^2$ peak irradiance, more preferably between 10 W/cm$^2$ to 18 W/cm$^2$, at the chosen wavelength.
3) Nitrogen may or may not be utilized during the optical fiber's exposure to UV LED light for oxygen inhibition.
4) Processing speeds may range from 1 m/min to 4000 m/min, more preferably between 1000 m/min to 3000 m/min.
5) Carbon dioxide may or may not be utilized to displace air prior to substrate entering applicator die.

Figure 2:
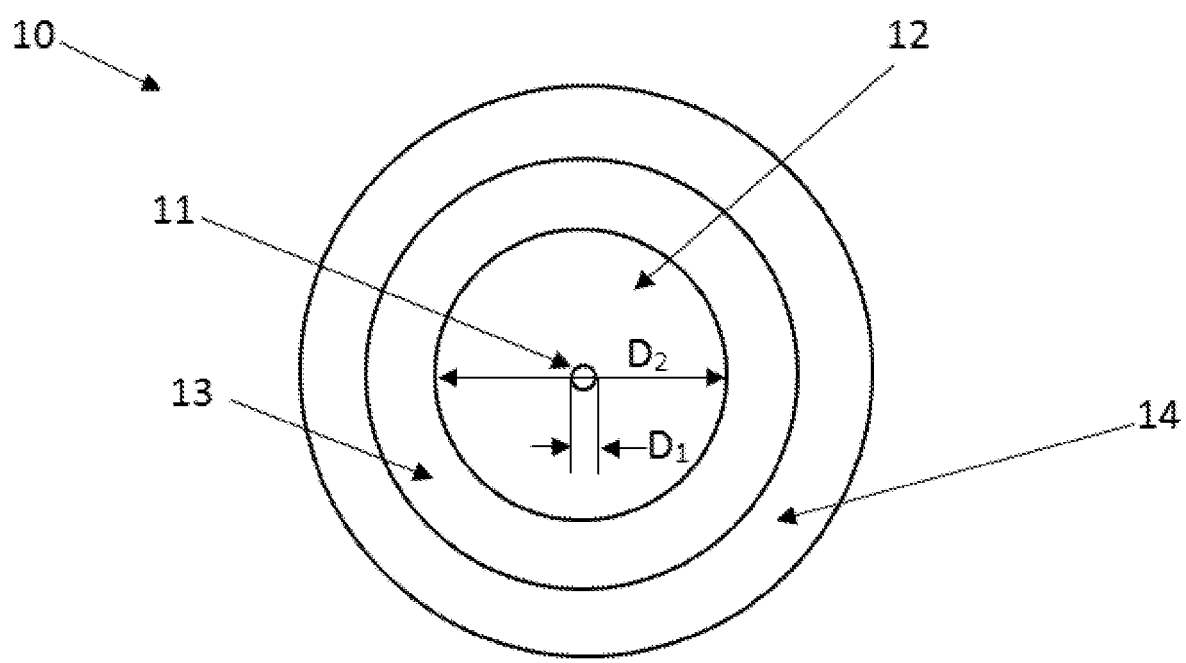
FIG. 2 is a cross-sectional view taken along the line A-A and illustrates a configuration for one example embodiment of the optical fiber of FIG. 1.

FIG. 2 is a cross-sectional view of fiber 10 an example of the result of the coating method described herein.

The optical fiber 10 comprises a core 11, a cladding 12, a primary coating 13 contacting and surrounding the outer annular cladding region, and a secondary coating 14. The outer diameter of the core 11 is $D_1$ and the outer diameter of the cladding 12 is $D_2$. The primary coating 13 is a typical primary coating that has an in situ modulus of less than 0.35 MPa, preferably less than 0.3 MPa, more preferably less than 0.25 MPa, and in preferred embodiments not more than 0.2 MPa. The primary coating 13 has an in situ glass transition temperature less than −35° C., preferably less than −40° C., more preferably less than −45° C., and in other preferred embodiments not more than −50° C. A primary coating with a low in situ modulus reduces the microbending which is the coupling mechanism between the modes propagating in the fiber. A low in situ glass transition temperature ensures that the in situ modulus of the primary coating will remain low even when the fiber is deployed in very cold environments. The microbending performance will therefore be stable with temperature, resulting in low mode coupling in all situations. The secondary coating 14 is in contact with and surrounds the primary coating 13. The secondary coating 14 has an in situ modulus of greater than 800 MPa, more preferably greater than 1110 MPa, more preferably greater than 1300 MPa, more preferably greater than 1400 MPa, and most preferably greater than 1500 MPa. A secondary coating with a high in situ modulus reduces the microbending which is the coupling mechanism between the modes propagating in the fiber.

In the embodiments shown and described herein, core 11 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof.

The cladding 12 may comprise pure silica glass ($SiO_2$), silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped", so long as the maximum relative refractive index [$\Delta_{1MAX}$] of the core 11 is greater than the maximum relative refractive index [$\Delta_{4MAX}$] of the cladding 12. According to one embodiment, cladding 12 is pure silica glass.

The primary coating 13 preferably has a higher refractive index than the cladding 12 of the optical fiber 10, in order to allow it to strip errant optical signals away from the core of optical fiber. For example, an exemplary transmission optical fiber 10 may have refractive index values at a wavelength of 1550 nm for the core and cladding of 1.447 and 1.436, respectively; as such, it is desirable that the refractive index of primary coating 13 be greater than 1.44 at 1550 nm. The primary coating 13 maintains adequate adhesion to the glass fiber during thermal and hydrolytic aging, yet (if needed) is capable of being strippable therefrom for splicing purposes. The primary coating 13 typically has a thickness in the range of 20-50 μm (e.g., about 25 or 32.5 μm), thinner thickness in the range of 15-25 μm for 200 μm fibers.

Coating 13 is a primary coating, which normally is applied directly to the glass fiber. Coating 13 is preferably formed from a soft crosslinked polymer material having a low in situ modulus (e.g., less than about 0.35 MPa at 25° C.) and a low in situ $T_g$ (e.g., less than about −35° C.). The in situ modulus is preferably less than about 0.3 MPa, more preferably less than 0.2 MPa. The in situ $T_g$ is preferably between about −100° C. and about −35° C., more preferably between about −100° C. and about −40° C., most preferably between about −100° C. and about −50° C.

The primary coating 13 preferably has a thickness that is less than about 40 more preferably between about 20 to about 40 μm, most preferably between about 20 to about 30 μm. Primary coating 13 is typically applied to the glass fiber and subsequently cured, as will be described in more detail herein below. Various additives that enhance one or more properties of the primary coating can also be present, including antioxidants, adhesion promoters, PAG compounds, photosensitizers, carrier surfactants, tackifiers, catalysts, stabilizers, surface agents, and optical brighteners of the types described above.

In an embodiment, suitable primary coating compositions may include, without limitation, about 10 to 90 weight percent, more preferably from about 25 to about 75 weight percent of one or more urethane acrylate oligomers; about 10 to about 65 weight percent, more preferably from about 25 to about 65 weight percent of one or more monofunctional ethylenically unsaturated monomers; about 0 to about 10 weight percent of one or more multifunctional ethylenically unsaturated monomers; about 1 to about 5 weight percent of one or more photoinitiators; about 0.5 to about 1.5 pph of one or more antioxidants; optionally about 0.5 to about 1.5 pph of one or more adhesion promoters; optionally about 0.1 to about 10 pph PAG compound; and about 0.01 to about 0.5 pph of one or more stabilizers.

In one embodiment, the primary coating 13 comprises 52 wt % BR 3741, (oligomer) available from Bomar Specialty Co., 41.5 wt % Photomer 4003 (monomer) available from Cognis, 5 wt % Tone M-100 (monomer) available from Dow Chemical, 1.5 wt % Irgacure 819 (photoinitiator) available from Ciba Specialty Chemical, 1 pph (3-Acryloxypropyl) trimethoxysilane (adhersion promoter) available from Gelest Incorporated, 1 pph Irganox 1035 (antioxidant) available from Ciba, and 0.03 pph Pentaerythritol tetrakis (3-mercaptoproprionate) (chain transfer agent) available from Aldrich. This embodiment of the primary coating 13 has an in situ modulus less than 0.35 MPa and an in situ glass transition temperature less than −35° C.

Coating 14 is the outer coating, and it serves the traditional purpose of a "secondary coating". The outer coating material 14 is, for example, the polymerization product of a coating composition whose molecules become highly cross-linked when polymerized. In the embodiments described herein coating 14 has a high in situ modulus (e.g., greater than about 800 MPa at 25° C.) and a high $T_g$ (e.g., greater than about 50° C.). The in situ secondary modulus is preferably greater than about 1000 MPa, more preferably greater than about 1100 MPa and most preferably greater than about 1200 MPa. According to some preferred embodiments, the in situ secondary modulus is greater than 1200 MPa. In other preferred embodiments, the in situ secondary modulus is between about 1000 MPa and about 8000 MPa, more preferably between about 1200 MPa and about 5000 MPa, and most preferably between about 1500 MPa and about 3000 MPa. The in situ $T_g$ of the secondary coating is preferably between about 50° C. and about 120° C., more preferably between about 50° C. and about 100° C. In an embodiment, the secondary coating 14 has a thickness that is less than about 40 μm, more preferably between about 20 to about 40 μm, most preferably between about 20 to about 30 μm.

Other suitable materials for use in outer (or secondary) coating materials, as well as considerations related to selection of these materials, are well known in the art and are described in, for example, U.S. Pat. Nos. 4,962,992 and 5,104,433 to Chapin. As an alternative to these, high modulus coatings have also been obtained using low oligomer content coating systems, as described in U.S. Pat. No. 6,775,451 to Botelho et al., and U.S. Pat. No. 6,689,463 to Chou et al. In addition, non-reactive oligomer components have been used to achieve high modulus coatings, as described in U.S. Application Publ. No. 20070100039 to Schissel et al. Outer coatings are typically applied to the previously coated fiber (either with or without prior curing) and subsequently cured, as will be described in more detail herein below. Various additives that enhance one or more properties of the coating can also be present, including antioxidants, PAG compounds, photosensitizers, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Suitable compositions for the secondary or outer coating 14 include, without limitation, about 0 to 20 weight percent of one or more urethane acrylate oligomers; about 75 to about 95 weight percent of one or more multifunctional ethylenically unsaturated monomers; about 0 to about 10 weight percent of one or more monofunctional ethylenically unsaturated monomers; about 1 to about 5 weight percent of one or more photoinitiators; about 0 to about 5 pph of one or more slip additives; and about 0.5 to about 1.5 pph of one or more antioxidants.

According to one embodiment of the present invention, the secondary coating 14 comprises 10 wt % KWS 4131 (oligomer) available from Bomar Specialty Co., 72 wt % Photomer 4028 (monomer) available from Cognis, 10 wt % triethylene glycol divinyl ether, 5 wt % Photomer 3016 (monomer) available from Cognis, 1.5 wt % Lucerin TPO (photoinitiator) available from BASF, 1.5 wt % Irgacure 184 (photoinitiator) available from Ciba Specialty Chemical (Hawthorne, N.Y.), 0.5 pph Irganox 1035 (antioxidant) available from Ciba. This embodiment of the secondary coating has an in situ modulus of about 1400 MPa and an in situ glass transition temperature (Tg) of about 50° C.

It is well known in the art how to formulate typical optical fiber coating for primary and secondary coatings for fiber as described above, as well as for ink and matrix materials for curing using broadband UV lamps. A good discussion of this technology and associated chemistry and test methods can be found in sections 4.6 to the end of chapter 4 in the textbook, "Specialty Optical Fibers Handbook" by A. Mendez and T. F. Morse, © Elsevier Inc. 2007, published by Elsevier. None of aforementioned references discuss, however, the problems created and to be solved when switching from the high energy broadband UV lamps to the much more efficient low energy monochromatic UV LED lamps.

Inventors presently hypothesize, without wishing to be bound to the theory, that a monochromatic UV or near-UV visible light source will not allow for good surface cure using the conventional formulary approach for standard optical fiber coatings due to the lack of critical wavelengths at shorter wavelength region to overcome the oxygen inhibition effect to achieve said surface cure. The result would be an optical fiber that would have its top coating layer substantially undercured and causing severe tackiness with high friction, which, when spooled/unspooled or in the cabling process may result in fiber breakage, especially at high speeds as is typically done.

The problem with the previous approaches is that, while, surface curing improvements are indeed observed, significant undesirable yellowing is also observed. This can be readily seen in Table 1, infra, by comparing Comparative Ex S1 and Comparative Ex S2. By comparing the film surface cure when cured by broadband UV lamps (the microwave D lamp) to the monochromatic LED bulb, one can readily see the undercure presented by the standard non-yellowing photoinitiator package (Comparative Example S1) when compared with the improved LED cure yellowing photoinitiator package (Comparative Example S2).

Oxygen inhibition, which is thought to negatively affect surface cure, can be somewhat mitigated by the inclusion of amines or amines adjacent to vinyl groups. However, these are basic components and can have a deleterious effect on fiber fatigue and fiber strength, and so do not represent workable solutions for optical fiber applications.

Components Possessing an Electron-Donating Substituent Attached to a Vinyl Group It has been surprisingly found that the inclusion of a component possessing an electron-donating substituent attached to a vinyl group can improve the surface cure of such coating layers, whilst simultaneously not interfering with the through-cure and also achieving the other objects of the invention, particularly when included in compositions cured by way of monochromatic actinic radiation sources.

One preferred example of a component possessing an electron-donating substituent attached to a vinyl group is vinyl ether. Vinyl ethers can be created from a variety of starting materials such as ethers, esters or biscarbamates, or vinyl ether terminated (poly) urethane or carbonates. Some non-limiting examples of each are included below:

Vinyl ether monomers from ethers: Specific examples of polyfunctional vinyl ethers include divinylether such as ethylene glycol divinyl ether, diethylene glycol divinyl ether, triethylene glycol divinyl ether, polyethylene glycol divinyl ether, propylene glycol divinyl ether, dipropylene glycol divinyl ether, isobutyl vinyl ether, butylene glycol divinyl ether, butanediol divinyl ether, hexanediol divinylether, cyclohexanediol divinyl ether, bisphenol A alkylene oxide divinyl ether, and bisphenol F alkylene oxide divinyle ether; polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, pentaerythritol divinyl ether dipentaerythritol pentavinyl ether, dipentaerythritol hexavinyl ether, an ethylene oxide adduct of trimethylolpropane trivinyl ether, a propylene oxide adduct of trimethylolpropane trivinyl ether, an ethylene oxide adduct of ditrimethylolpropane tetravinyl ether, a propylene oxide adduct of ditrimethylolpropane tetravinyl ether, an ethylene oxide adduct of pentaerythritol tetravinyl ether, a propylene oxide adduct of pentaerythritol tetravinyl ether, an ethylene oxide adduct of dipentaerythritol hexavinyl ether, and a propylene oxide adduct of dipentaerythritol hexavinyl ether.

Vinyl ether monomers from esters or biscarbamate: Specific examples of polyfunctional vinyl ethers such as divinyl adipate, divinyl terephthalate, divinyl cyclohexyl dicaroxylate. Bis[4-(vinyloxy)butyl] adipate (VEctomer®4060), bis[4-(vinyloxy)butyl] succinate (VEctomer®4030), bis[4-(vinyloxy)butyl] isophthalte (VEctomer®4010), bis[4-(vinyloxymethyl)cyclohexylmethyl] glutarate (VEctomer®4020), tris[4-(vinyloxy)butyl] trimellitate (VEctomer®5015), bis[4-(vinyloxymethyl)cyclohexylmethyl] isophthalate (VEctomer®4040), bis[4-(vinyloxy)butyl](4-methyl-1,3-phenylene) biscarbamate (VEctomer®4220) and bis[4-(vinyloxy)butyl] (methylenedi-4,1-phenylene) biscarbamate (VEctomer®4210).

Vinyl ether terminated urethanes or carbonate: specific examples of polyfunctional vinylethers, such as polyurethane or polycarbonate endcapped with hydorxy vinyl ether in which it has at least a hydroxyl group and at least a vinyl ether group in intramolecular; for example, 2-hydroxyethyl vinyl ether, 3-hydroxypropyl vinyl ether, 2-hydroxypropyl vinyl ether, 2-hydroxy isopropylvinyl ether, 4-hydroxybutyl vinyl ether, 3-hydroxybutylvinyl ether, 2-hydroxybutylvinyl ether, 3-hydroxy isobutyl vinyl ether, 2-hydroxy isobutyl vinyl ether, 1-methyl-3-hydroxypropyl vinyl ether, 1-methyl-2-hydroxypropyl vinyl ether, 1-hydroxy methyl-propyl vinyl ether, 4-hydroxycyclohexylvinyl ether, 1,6-hexanediol monovinyl ether, 1,4-cyclohexane dimethanol monovinyl ether, 1,3-cyclohexane dimethanol monovinyl ether, 1,2-cyclohexane dimethanol monovinyl ether, p-xylene glycol monovinyl ether, m-xylene glycol monovinyl ether, o-xylene glycol monovinyl ether, diethylene-glycol monovinyl ether, triethylene glycol monovinyl ether, tetraethylene glycol monovinyl ether, pentaethylene glycol monovinyl ether, oligo ethylene glycol monovinyl ether, polyethylene-glycol monovinyl ether, dipropylene glycol monovinyl ether, tripropylene glycol monovinyl ether, and tetrapropylene glycol monovinyl ether; as well as derivatives, such as pentapropylene glycol monovinyl ether, oligo propylene glycol monovinyl ether, and polypropylene-glycol monovinyl ether, to name a few.

In a more preferred embodiment, the use of alkoxylated multifunctional vinyl ether monomers such as ethoxylated, propoxylated, and butoxylated variants of the above are contemplated. Also contemplated are other reactive monomers that contain an electron donating moiety adjacent to the vinyl group. Examples of these are vinyl phosphonate, vinyl thioethers, and vinyl sulfonates.

One or more of the aforementioned components possessing an electron-donating substituent attached to a vinyl group can be employed in compositions according to the present invention in any suitable amount, and may be chosen singly or in combination of one or more of the types enumerated herein. In a preferred embodiment, the component possessing an electron-donating substituent attached to a vinyl group is present in an amount, relative to the entire weight of the composition, of from about 0.5 wt. % to about 50 wt. %, more preferably from about 0.5 wt. % to about 20 wt. %, more preferably from about 2 wt. % to about 20 wt. %, more preferably from about 5 wt. % to about 20 wt. %, more preferably about 5 wt. % to about 12 wt. %.

The vinyl ether monomers described herein can further be replaced or combined with ethylenically unsaturated polymerizable compounds in suitable amounts to achieve other desired characteristics.

Ethylenically Unsaturated Polymerizable Compounds

The ethylenically unsaturated polymerizable compounds can contain one or more than one olefinic double bond. They may be low molecular weight (monomeric) or high molecular weight (oligomeric) compounds.

Reactive Diluent Monomers

Typical examples of lower molecular weight monomers containing one double bond are alkyl or hydroxyalkyl acrylates or methacrylates, for example methyl, ethyl, butyl, 2-ethylhexyl and 2-hydroxyethyl acrylate, isobornyl acrylate, and methyl and ethyl methacrylate. Further examples of these monomers are acrylonitrile, acrylamide, methacrylamide, N-substituted (meth)acrylamides, vinyl esters such as vinyl acetate, styrene, alkylstyrenes, halostyrenes, N-vinylpyrrolidone, N-vinyl caprolactam, vinyl chloride and vinylidene chloride. Examples of monomers containing more than one double bond are ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, vinyl acrylate, divinyl benzene, divinyl succinate, diallyl phthalate, triallyl phosphate, triallyl isocyanurate or tris(2-acryloylethyl)isocyanurate.

One or more of the aforementioned reactive diluent monomers can be employed in compositions according to the present invention in any suitable amount, and may be chosen singly or in combination of one or more of the types enumerated herein. In a preferred embodiment, the reactive diluent monomer component is present in an amount, relative to the entire weight of the composition, of from about 5 wt. % to about 90 wt. %, more preferably from about 10 wt. % to about 90 wt. %, more preferably from about 10 wt. % to about 80 wt. %., more preferably from about 10 wt. % to about 60 wt. %.

Oligomers

Generally, optical fiber coating materials comprise as an oligomer a urethane acrylate oligomer, comprising an acrylate group, urethane groups and a backbone. The backbone is derived from a polyol which has been reacted with a diisocyanate and hydroxyalkylacrylate.

Examples of suitable polyols are polyether polyols, polyester polyols, polycarbonate polyols, polycaprolactone polyols, acrylic polyols, and other polyols. These polyols may be used either individually or in combinations of two or more. There are no specific limitations to the manner of polymerization of the structural units in these polyols. Each of random polymerization, block polymerization, or graft polymerization is acceptable.

Given as examples of the polyether polyols are polyethylene glycol, polypropylene glycol, polypropylene glycol-ethyleneglycol copolymer, polytetramethylene glycol, polyhexamethylene glycol, polyheptamethylene glycol, polydecamethylene glycol, and polyether diols obtained by ring-opening copolymerization of two or more ion-polymerizable cyclic compounds. Here, given as examples of the ion-polymerizable cyclic compounds are cyclic ethers such as ethylene oxide, isobutene oxide, tetrahydrofuran, 2-methyltetrahydrofuran, 3-methyltetrahydrofuran, dioxane, trioxane, tetraoxane, cyclohexene oxide, styrene oxide, epichlorohydrin, isoprene monoxide, vinyl oxetane, vinyl tetrahydrofuran, vinyl cyclohexene oxide, phenyl glycidyl ether, butyl glycidyl ether, and glycidyl benzoate. Specific examples of combinations of two or more ion-polymerizable cyclic compounds include combinations for producing a binary copolymer such as tetrahydrofuran and 2-methyltetrahydrofuran, tetrahydrofuran and 3-methyltetrahydrofuran, and tetrahydrofuran and ethylene oxide; and combinations for producing a ternary copolymer such as a combination of tetrahydrofuran, 2-methyltetrahydrofuran, and ethylene oxide, a combination of tetrahydrofuran, butene-1-oxide, and ethylene oxide, and the like. The ring-opening copolymers of these ion-polymerizable cyclic compounds may be either random copolymers or block copolymers.

Included in these polyether polyols are products commercially available under the trademarks, for example, PTMG1000, PTMG2000 (manufactured by Mitsubishi Chemical Corp.), PEG #1000 (manufactured by Nippon Oil and Fats Co., Ltd.), PTG650 (SN), PTG1000 (SN), PTG2000 (SN), PTG3000, PTGL1000, PTGL2000 (manufactured by Hodogaya Chemical Co., Ltd.), PEG400, PEG600, PEG1000, PEG1500, PEG2000, PEG4000, PEG6000 (manufactured by Daiichi Kogyo Seiyaku Co., Ltd.) and Pluronics (by BASF).

Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer acid, isophthalic acid, terephthalic acid, maleic acid, fumaric acid, adipic acid, sebasic acid, and the like can be given.

These polyester polyol compounds are commercially available under the trademarks such as MPD/IPA500, MPD/IPA1000, MPD/IPA2000, MPD/TPA500, MPD/TPA1000, MPD/TPA2000, Kurapol A-1010, A-2010, PNA-2000, PNOA-1010, and PNOA-2010 (manufactured by Kuraray Co., Ltd.).

As examples of the polycarbonate polyols, polycarbonate of polytetrahydrofuran, poly(hexanediol carbonate), poly(nonanediol carbonate), poly(3-methyl-1,5-pentamethylene carbonate), and the like can be given.

As commercially available products of these polycarbonate polyols, DN-980, DN-981 (manufactured by Nippon Polyurethane Industry Co., Ltd.), Priplast 3196, 3190, 2033 (manufactured by Unichema), PNOC-2000, PNOC-1000 (manufactured by Kuraray Co., Ltd.), PLACCEL CD220, CD210, CD208, CD205 (manufactured by Daicel Chemical Industries, Ltd.), PC-THF-CD (manufactured by BASF), and the like can be given.

Polycaprolactone diols obtained by reacting e-caprolactone and a diol compound are given as examples of the polycaprolactone polyols having a melting point of 0° C. or higher. Here, given as examples of the diol compound are ethylene glycol, polyethylene glycol, polypropylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like.

Commercially available products of these polycaprolactone polyols include PLACCEL 240, 230, 230ST, 220, 220ST, 220NP1, 212, 210, 220N, 210N, L230AL, L220AL, L220PL, L220PM, L212AL (all manufactured by Daicel Chemical Industries, Ltd.), Rauccarb 107 (by Enichem), and the like.

As examples of other polyols ethylene glycol, 1,4-butanediol, 1,5-pentanediol, 1,6-hexanediol, polyoxyethylene bisphenol A ether, polyoxypropylene bisphenol A ether, polyoxyethylene bisphenol F ether, polyoxypropylene bisphenol F ether, and the like can be given.

As these other polyols, those having a alkylene oxide structure in the molecule, in particular polyether polyols, are preferred. In an embodiment, polyols containing polytetramethylene glycol and copolymer glycols of butyleneoxide and ethyleneoxide are particularly preferred.

The reduced number average molecular weight derived from the hydroxyl number of these polyols is usually from about 50 to about 15,000, and preferably from about 1,000 to about 8,000.

Given as examples of the polyisocyanate used for the oligomer are 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanato-ethyl)fumarate, 6-isopropyl-1,3-phenyl diisocyanate, 4-diphenylpropane diisocyanate, hydrogenated diphenylmethane diisocyanate, hydrogenated xylylene diisocyanate, tetramethyl xylylene diisocyanate, lysine isocyanate, and the like. These polyisocyanate compounds may be used either individually or in combinations of two or more. Preferred polyisocyanates are isophorone diisocyanate, 2,2,4-trimethyihexamethylene diisocyanate, 2,4-tolylene diisocyanate, and 2,6-tolylene diisocyanate.

Examples of the hydroxyl group-containing (meth)acrylate used in the oligomer, include, (meth)acrylates derived from (meth)acrylic acid and epoxy and (meth)acrylates comprising alkylene oxides, more in particular, 2-hydroxy ethyl (meth)acrylate, 2-hydroxypropylacrylate and 2-hydroxy-3-oxyphenyl(meth)acrylate. Acrylate functional groups are preferred over methacrylates.

The ratio of polyol, polyisocyanate, and hydroxyl group-containing (meth)acrylate used for preparing the urethane (meth)acrylate is determined so that about 1.1 to about 3 equivalents of an isocyanate group included in the polyisocyanate and about 0.1 to about 1.5 equivalents of a hydroxyl group included in the hydroxyl group-containing (meth) acrylate are used for one equivalent of the hydroxyl group included in the glycol.

In the reaction of these three components, a urethanization catalyst such as copper naphthenate, cobalt naphthenate, zinc naphthenate, di-n-butyl tin dilaurate, triethylamine, and triethylenediamine-2-methyltriethyleneamine, is usually used in an amount from about 0.01 to about 1 wt % of the total amount of the reactant. The reaction is carried out at a temperature from about 10 to about 90° C., and preferably from about 30 to about 80° C.

The number average molecular weight of the urethane (meth)acrylate used in the composition of the present invention is preferably in the range from about 600 to about 20,000, and more preferably from about 2,200 to about 10,000. If the number average molecular weight of the urethane (meth)acrylate is less than about 100, the resin composition tends to solidify; on the other hand, if the number average molecular weight is larger than about 20,000, the viscosity of the composition becomes high, making handling of the composition difficult. Particularly preferred for inner primary coatings are oligomers having a number average molecular weight between about 2,200 and about 5,500.

Other oligomers that can be used include polyester (meth) acrylate, epoxy (meth)acrylate, polyamide (meth)acrylate, siloxane polymer having a (meth)acryloyloxy group, a reactive polymer obtained by reacting (meth)acrylic acid and a copolymer of glycidyl methacrylate and other polymerizable monomers, and the like. Particularly preferred are bisphenol A based acrylate oligomers such as alkoxylated bisphenol-A-diacrylate and diglycidyl-bisphenol-A-diacrylate.

Beside the above-described components, other curable oligomers or polymers may be added to the liquid curable resin composition of the present invention to the extent that the characteristics of the liquid curable resin composition are not adversely affected.

Preferred oligomers are polyether based acrylate oligomers, polycarbonate acrylate oligomers, polyester acrylate oligomers, alkyd acrylate oligomers and acrylated acrylic oligomers. More preferred are the urethane-containing oligomers thereof. Even more preferred are polyether urethane acrylate oligomers and urethane acrylate oligomers using blends of the above polyols, and particularly preferred are aliphatic polyether urethane acrylate oligomers. The term "aliphatic" refers to a wholly aliphatic polyisocyanate used.

However, also urethane-free acrylate oligomers, such as urethane-free acrylated acrylic oligomers, urethane-free polyester acrylate oligomers and urethane-free alkyd acrylate oligomers are also preferred. Examples of such high molecular weight (oligomeric) polyunsaturated compounds are acrylated epoxy resins, acrylated polyethers, and acrylated polyesters. Further examples of unsaturated oligomers are unsaturated polyester resins, which are usually prepared from maleic acid, phthalic acid and one or more diols and which have molecular weights of greater than about 500. Unsaturated oligomers of this type are also known as prepolymers. Typical examples of unsaturated compounds are esters of ethylenically unsaturated carboxylic acids and polyols or polyepoxides, and polymers containing ethylenically unsaturated groups in the chain or in side groups, including unsaturated polyesters, polyamides and copolymers thereof, polybutadiene and butadiene copolymers, polyisoprene and isoprene copolymers, polymers and copolymers containing (meth)acrylic groups in side-chains, as well as mixtures of one or more than one such polymer. Illustrative examples of unsaturated carboxylic acids are acrylic acid, methacrylic acid, crotonic acid, itaconic acid, cinnamic acid, unsaturated fatty acids such as linolenic acid or oleic acid. Suitable polyols are aromatic, aliphatic and cycloaliphatic polyols. Aromatic polyols are typically hydroquinone, 4,4'-dihydroxydiphenyl, 2,2-bis(4-hydroxyphenyl)propane, as well as novolacs and cresols. Polyepoxides include those based on the cited polyols, for instance on the aromatic polyols and epichlorohydrin.

Further suitable polyols are polymers and copolymers which contain hydroxyl groups in the polymer chain or in side groups, for example polyvinyl alcohol and copolymers thereof or hydroxyalkyl polymethacrylates or copolymers thereof. Other suitable polyols are oligoesters carrying hydroxyl end groups. Illustrative examples of aliphatic and cycloaliphatic polyols are alkylenediols containing for example 2 to 12 carbon atoms, including ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of for instance 200 to 1500, 1,3-cyclopentanediol, 1,2-, 1,3- or 1,4-cyclohexanediol, 1,4-dihydroxymethylcyclohexane, glycerol, tris(-hydroxyethyl)amine, trimethylolethane, trimethylolpropane, pentaerythritol, dipentaerythritol and sorbitol. The polyols may be esterified partially or completely with one or with different unsaturated carboxylic acids, in which case the free hydroxyl groups of the partial esters may be modified, for example etherified, or esterified with other carboxylic acids. Illustrative examples of esters are: trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentacrylate, dipentaerythritol hexacrylate, tripentaerythritol octacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentacrylate, sorbitol hexacrylate, oligoester acrylates and methacrylates, glycerol di- and -triacrylate, 1,4-cyclohexanediacrylate, bisacrylates and bismethacrylates of polyethylene glycol having molecular weights of 200 to 1500, or mixtures thereof. Polyfunctional monomers and oligomers are available for example from UCB Chemicals of Smyrna, Ga., and Sartomer of Exton, Pa.

One or more of the aforementioned ethylenically unsaturated oligomers can be employed in compositions according to the present invention in any suitable amount, and may be chosen singly or in combination of one or more of the types enumerated herein. In a preferred embodiment, the ethylenically unsaturated oligomer component is present in an amount, relative to the entire weight of the composition, of from about 5 wt. % to about 90 wt. %, more preferably from about 10 wt. % to about 90 wt. %, more preferably from about 10 wt. % to about 80 wt. %., more preferably from about 10 wt. % to about 60 wt. %.

Free-Radical Photoinitiator Component

In preferred embodiments, the liquid radiation curable resin for coating an optical fiber of the present invention includes a free-radical photoinitiator component. The photoinitiator is a compound that chemically changes due to the action of light or the synergy between the action of light and the electronic excitation of a sensitizing dye to produce at least one of a radical, an acid, and a base.

According to an embodiment of the present invention, the free-radical photoinitiator is an acylphosphine oxide photoinitiator. Acylphosphine oxide photoinitiators are disclosed for example in U.S. Pat. Nos. 4,324,744, 4,737,593, 5,942,290, 5,534,559, 6,020,529, 6,486,228, and 6,486,226.

The acylphosphine oxide photoinititors are bisacylphosphine oxides (BAPO) or monoacylphosphine oxides (MAPO).

The bisacylphosphine oxide photoinitiators are of the formula I:

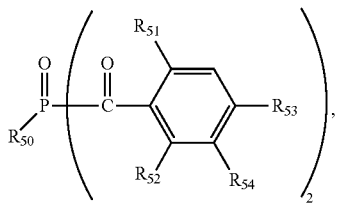

(I)

wherein $R_{50}$ is $C_1$-$C_{12}$ alkyl, cyclohexyl or phenyl which is unsubstituted or is substituted by 1 to 4 halogen or $C_1$-$C_8$ alkyl;

$R_{51}$ and $R_{52}$ are each independently of the other $C_1$-$C_8$ alkyl or $C_1$-$C_8$ alkoxy;

$R_{53}$ is hydrogen or $C_1$-$C_8$ alkyl; and $R_{54}$ is hydrogen or methyl.

For example, $R_{50}$ is $C_2$-$C_{10}$ alkyl, cyclohexyl or phenyl which is unsubstituted or is substituted by 1 to 4 $C_1$-$C_4$ alkyl, Cl or Br. Another embodiment is where $R_{50}$ is $C_3$-$C_8$ alkyl, cyclohexyl or phenyl which is unsubstituted or is substituted in the 2-, 3-, 4- or 2,5-positions by $C_1$-$C_4$ alkyl. For instance, $R_{50}$ is $C_4$-$C_{12}$ alkyl or cyclohexyl, $R_{51}$ and $R_{52}$ are each independently of the other $C_1$-$C_8$ alkyl or $C_1$-$C_8$ alkoxy and $R_{53}$ is hydrogen or $C_1$-$C_8$ alkyl. For instance, $R_{51}$ and $R_{52}$ are $C_1$-$C_4$ alkyl or $C_1$-$C_4$ alkoxy and $R_{53}$ is hydrogen or $C_1$-$C_4$ alkyl. Another embodiment is where $R_{51}$ and $R_{52}$ are methyl or methoxy and $R_{53}$ is hydrogen or methyl. For example $R_{51}$, $R_{52}$ and $R_{53}$ are methyl. Another embodiment is where $R_{51}$, $R_{52}$ and $R_{53}$ are methyl and $R_{54}$ is hydrogen. Another embodiment is where $R_{50}$ is $C_3$-$C_8$ alkyl. For example, $R_{51}$ and $R_{52}$ are methoxy, $R_{53}$ and $R_{54}$ are hydrogen and $R_{50}$ is isooctyl. For instance $R_{50}$ is isobutyl. For example $R_{50}$ is phenyl. The present bisacylphosphine oxide photoinitiator is for example bis(2,4,6-trimethylbenzoyl)-phenylphosphine oxide (CAS #162881-26-7) or is bis(2,4,6-trimethylbenzoyl)-(2,4-bis-pentyloxyphenyl)phosphine oxide.

The monoacylphosphine oxide photoinitiators are of the formula II:

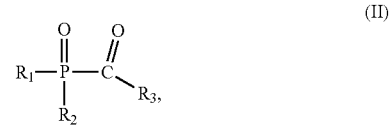

(II)

in which $R_1$ and $R_2$ independently of one another are $C_1$-$C_{12}$ alkyl, benzyl, phenyl which is unsubstituted or substituted from one to four times by halogen, $C_1$-$C_8$ alkyl and/or $C_1$-$C_8$ alkoxy, or are cyclohexyl or a group —$COR_3$, or $R_1$ is —$OR_4$;

$R_3$ is phenyl which is unsubstituted or substituted from one to four times by $C_1$-$C_8$ alkyl, $C_1$-$C_8$ alkoxy, $C_1$-$C_8$ alkylthio and/or halogen; and $R_4$ is $C_1$-$C_8$ alkyl, phenyl or benzyl. For example, $R_1$ is —$OR_4$. For example $R_2$ is phenyl which is unsubstituted or substituted from one to four times by halogen, $C_1$-$C_8$ alkyl and/or $C_1$-$C_8$ alkoxy. For example $R_3$ is phenyl which is unsubstituted or substituted from one to four times by $C_1$-$C_8$ alkyl. For example, the present monoacylphosphine oxide is 2,4,6-trimethylbenzoylethoxyphenylphosphine oxide (CAS #84434-11-7) or 2,4,6-trimethylbenzoyldiphenylphosphine oxide (CAS #127090-72-6).

Compositions according to the present invention may also employ further photoinitiators, for example α-hydroxy ketone photoinitiators of the formula III:

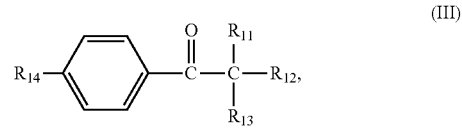

(III)

where $R_{11}$ and $R_{12}$ independently of one another are hydrogen, $C_1$-$C_6$ alkyl, phenyl, $C_1$-$C_6$ alkoxy, $OSiR_{16}(R_{17})_2$ or —$O(CH_2CH_2O)_q$—$C_1$-$C_6$ alkyl, or $R_{11}$ and $R_{12}$, together with the carbon atom to which they are attached, form a cyclohexyl ring;

q is a number from 1 to 20;

$R_{13}$ is OH, $C_1$-$C_{16}$ alkoxy or —$O(CH_2CH_2O)_q$—$C_1$-$C_6$ alkyl;

$R_{14}$ is hydrogen, $C_1$-$C_{18}$ alkyl, $C_1$-$C_{12}$ hydroxyalkyl, $C_1$-$C_{18}$ alkoxy, —$OCH_2CH_2$—$OR_{15}$, —$CH$=$CH_2$, —$C(CH_3)$=$CH_2$ or is

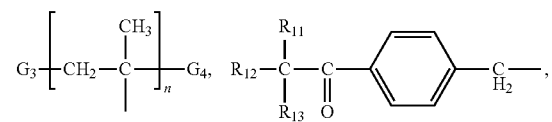

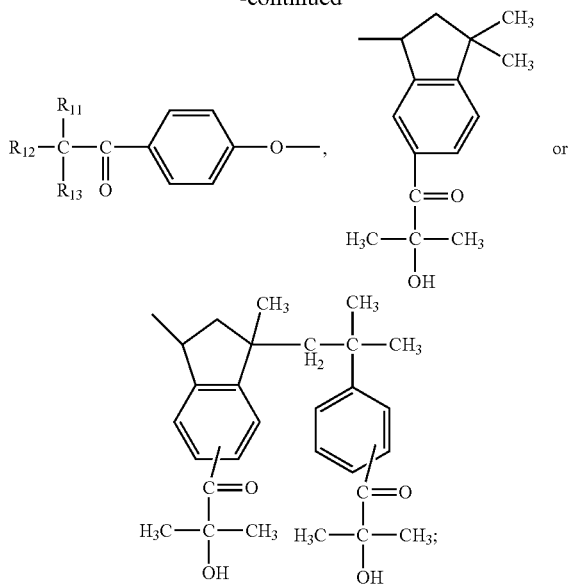

n is a number from 2 to 10;
$R_{15}$ is hydrogen, —COCH=$CH_2$ or —COC($CH_3$)=$CH_2$;
$R_{16}$ and $R_{17}$ independently of one another are $C_1$-$C_8$ alkyl or phenyl; and
$G_3$ and $G_4$ independently of one another are end groups of the polymeric structure, preferably hydrogen or methyl.

α-hydroxy ketone photoinitiators that are of interest are those in which $R_{11}$ and $R_{12}$ independently of one another are hydrogen, $C_1$-$C_6$ alkyl or phenyl or $R_{11}$ and $R_{12}$, together with the carbon atom to which they are attached, form a cyclohexyl ring, $R_{13}$ is OH, and $R_{14}$ is hydrogen, $C_1$-$C_{12}$ alkyl, $C_1$-$C_{12}$ alkoxy, —$OCH_2CH_2OR_{15}$, —C($CH_3$)=$CH_2$ or is

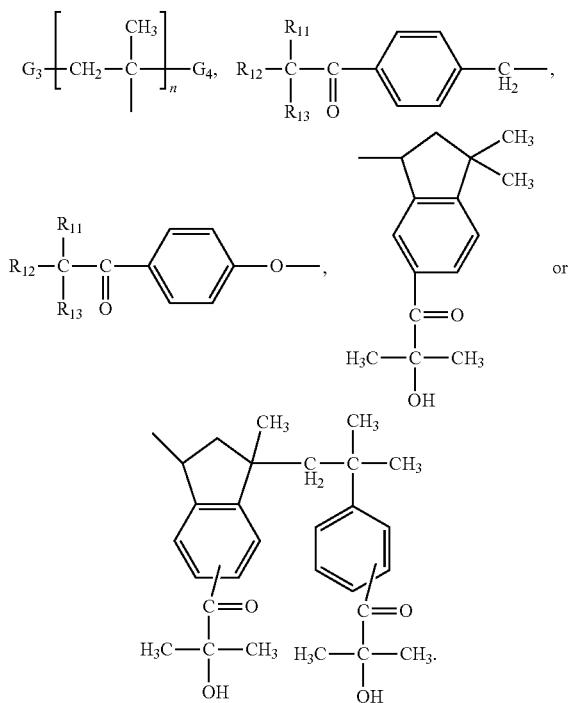

For example, suitable as the α-hydroxy ketone photoinitiators are those in which $R_{11}$ and $R_{12}$ independently of one another are methyl or ethyl or $R_{11}$ and $R_{12}$, together with the carbon atom to which they are attached, form a cyclohexyl ring, $R_{13}$ is hydrogen and $R_{14}$ is hydrogen, $C_1$-$C_4$ alkyl, $C_1$-$C_4$ alkoxy or —$OCH_2CH_2OH$. Interesting also are compounds, wherein $R_{14}$ is

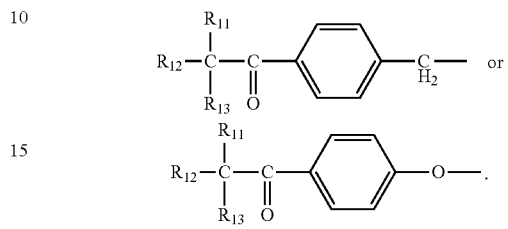

For instance, suitable α-hydroxy ketone photoinitiators are
α-hydroxycyclohexyl phenyl ketone,
2-hydroxy-2-methyl-1-phenylpropanone,
2-hydroxy-2-methyl-1-(4-isopropylphenyl)propanone,
2-hydroxy-2-methyl-1-(4-dodecylphenyl)propanone,
2-Hydroxy-1-{4-[4-(2-hydroxy-2-methyl-propionyl)-benzyl]-phenyl}-2-methyl-propan-1-one and
2-hydroxy-2-methyl-1-[(2-hydroxyethoxy)phenyl]propanone.

The present α-hydroxy ketone photoinitiator is for example α-hydroxycyclohexylphenyl ketone or 2-hydroxy-2-methyl-1-phenyl-1-propanone. Straight or branched chain alkyl is for example, methyl, ethyl, propyl, isopropyl, butyl, isobutyl, sec-butyl, tert-butyl, pentyl, isopentyl, isooctyl, hexyl, heptyl, octyl, nonyl, decyl or dodecyl. Likewise alkoxy or alkylthio are of the same straight or branched chains.

Photoinitiators according to the present invention may be employed singularly or in combination of one or more as a blend. Suitable photoinitiator blends (PI blends) are for example disclosed in U.S. Pat. No. 6,020,528 and U.S. Pat. app. No. 60/498,848. The present PI (photoinitiator) blends are for example a mixture of bis(2,4,6-trimethylbenzoyl) phenylphosphine oxide (CAS #162881-26-7) and 2,4,6,-trimethylbenzoylethoxyphenylphosphine oxide (CAS #84434-11-7) in ratios by weight of about 1:11, 1:10, 1:9, 1:8 or 1:7.

Another especially suitable PI blend is a mixture of bis(2,4,6-trimethylbenzoyl)phenylphosphine oxide, 2,4,6,-trimethylbenzoylethoxyphenylphosphine oxide and 2-hydroxy-2-methyl-1-phenyl-1-propanone (CAS #7473-98-5) in weight ratios of for instance about 3:1:15 or 3:1:16 or 4:1:15 or 4:1:16. Another suitable PI blend is a mixture of bis(2,4,6-trimethylbenzoyl)phenylphosphine oxide and 2-hydroxy-2-methyl-1-phenyl-1-propanone in weight ratios of for instance about 1:3, 1:4 or 1:5. The present acylphosphine oxide PI or PI blend is present in the radiation-curable compositions from about 0.2 to about 10% by weight, based on the weight of the composition. For instance, the PI or PI blend is present from about 0.5 to about 8%, about 1 to about 7%, or about 2, 3, 4, 5 or 6% by weight based on the weight of the radiation-curable composition.

Other suitable photoinitiators according to this invention are for or example, other mono- or bisacylphosphinoxides such as diphenyl-2,4,6-trimethylbenzoylphosphine oxide or bis(2,6-dimethoxybenzoyl)-2,4,4-trimethylpentylphosphineoxide; α-hydroxyketones, such as 1-hydroxycyclohexylphenylketone or 2-hydroxy-1-[4-(2-hydroxyethoxy)phenyl]-2-methyl-1-propanone; α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)-benzophenone, 4,4'-bis(diethylamino)benzophenone, methyl2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5'-oxo-di(ethyleneoxydicarbonylphenyl) or 1,2-(benzoylcarboxy)ethane.

Other suitable photoinitiators employed according to this invention, with or without acylphosphine oxide photoinitiators, are for example oxime esters as disclosed in U.S. Pat. No. 6,596,445. A suitable oxime ester photoinitiator is for example:

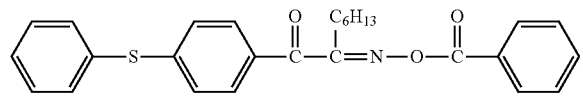

Another class of suitable photoinitiators according to this invention, with or without acylphosphine oxide photoinitiators, are for example phenyl glyoxalates, for example as disclosed in U.S. Pat. No. 6,048,660. For example phenyl glyoxalates of the formula:

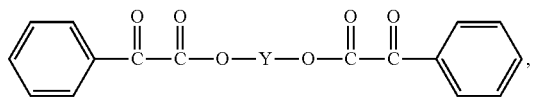

wherein Y is $C_1$-$C_{12}$alkylene, cyclohexylene, $C_2$-$C_{40}$alkylene interrupted one or more times by cyclohexylene, O, S, or $NR_{30}$, and $R_{30}$ is hydrogen, $C_1$-$C_{12}$alkyl or phenyl, preferably Y is $CH_2CH_2$—O—$CH_2CH_2$.

Without wishing to be bound by any theory, it is believed that the number of conjugated double-bonds in any single free-radical photoinitiator molecule can significantly contribute to the yellowing effect produced therefrom. Further, inventors have discovered that sulfur-containing photoinitiators tend also to produce undesirable yellowing effects. In an embodiment of the invention, therefore, the free-radical photoinitiator component has an average of not more than 12 conjugated double-bonds in any single molecule. In another embodiment of the invention, the free-radical photoinitiator component is also free of sulfur atoms.

One or more of the aforementioned free-radical photoinitiators can be employed in compositions according to the present invention in any suitable amount, and may be chosen singly or in combination of one or more of the types enumerated herein. In a preferred embodiment, the free-radical photoinitiator component is present in an amount, relative to the entire weight of the composition, of from about 0.1 wt. % to about 10 wt. %, more preferably from about 0.1 wt. % to about 5 wt. %, more preferably from about 1 wt. % to about 5 wt. %.

Additives

Additives are also typically added to optical fiber coatings to achieve certain desirable characteristics such as improved shelf life, improved coating oxidative and hydrolytic stability, and the like. There are many different types of desirable additives, and the invention discussed herein is not intended to be limited by these, nevertheless they are included in the envisioned embodiments since they have desirable effects.

Examples of these are thermal inhibitors, which are intended to prevent premature polymerization, examples being hydroquinone, hydroquinone derivatives, p-methoxyphenol, beta-naphthol or sterically hindered phenols, such as 2,6-di(tert-butyl)-p-cresol. The shelf life in the dark can be increased, for example, by using copper compounds, such as copper naphthenate, copper stearate or copper octoate, phosphorus compounds, for example triphenylphosphine, tributylphosphine, triethyl phosphite, triphenyl phosphite or tribenzyl phosphite, quaternary ammonium compounds, such as tetramethylammonium chloride or trimethylbenzylammonium chloride.

In order to keep out atmospheric oxygen during the polymerization, paraffin or similar waxlike substances can be added; these migrate to the surface on commencement of the polymerization because of their low solubility in the polymer, and form a transparent surface layer which prevents the ingress of air. It is likewise possible to apply an oxygen barrier layer.

Light stabilizers which can be added are UV absorbers, for example well known commercial UV absorbers of the hydroxyphenylbenzotriazole, hydroxyphenyl-benzophenone, oxalamide or hydroxyphenyl-s-triazine type. It is possible to use individual such compounds or mixtures thereof, with or without the use of sterically hindered relatively non-basic amine light stabilizers (HALS). Sterically hindered amines are for example based on 2,2,6,6-tetramethylpiperidine. UV absorbers and sterically hindered amines are for example:

2-(2-Hydroxyphenyl)-2H-benzotriazoles, for example known commercial hydroxyphenyl-2H-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)

phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-ditbutylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Other Additives

To accelerate the photopolymerization it is possible to add accelerators, coinitiators and autoxidizers such as thiols, thioethers, disulfides and phosphines, as are described, for example, in EP-A-438 123 and GB-A-2 180 358.

The photopolymerization can also be accelerated by the addition of photosensitizers, which shift or broaden the spectral sensitivity. These are, in particular, aromatic carbonyl compounds, such as benzophenone derivatives, thioxanthone derivatives, anthraquinone derivatives and 3-acylcoumarin derivatives, and also 3-(aroylmethylene)thiazolines, and also eosine, rhodamine and erythrosine dyes.

The curing procedure can be assisted, in particular, by compositions which are pigmented (for example with titanium dioxide), and also by adding a component which forms free radicals under thermal conditions, for example an azo compound such as 2,2'-azobis(4-methoxy-2,4-dimethylvaleronitrile), a triazene, a diazo sulfide, a pentazadiene or a peroxy compound, such as a hydroperoxide or peroxycarbonate, for example t-butyl hydroperoxide, as described in U.S. Pat. No. 4,753,817.

The novel compositions can also include a photoreducible dye, for example xanthene, benzoxanthene, benzothioxanthene, thiazine, pyronine, porphyrin or acridine dyes, and/or a trihalomethyl compound which can be cleaved by radiation. Similar compositions are described, for example, in U.S. Pat. No. 5,229,253.

Other conventional additives may be used depending on the intended application. Examples include fluorescent whiteners, fillers, pigments, dyes, wetting agents or levelling assistants. Thick and pigmented coatings can also contain glass microbeads or powdered glass fibers, as described in U.S. Pat. No. 5,013,768, for example.

One or more of the aforementioned additives can be employed in compositions according to the present invention in any suitable amount, and may be chosen singly or in combination of one or more of the types enumerated herein. In a preferred embodiment, the additive component is present in an amount, relative to the entire weight of the composition, of from about 0.01 wt. % to about 5 wt. %, more preferably from about 0.1 wt. % to about 2 wt. %. According to another embodiment, the one or more of the aforementioned additives are included in an amount from about 1 wt. % to about 5 wt. %.

The following examples further illustrate the invention but, of course, should not be construed as in any way limiting its scope.

EXAMPLES

These examples illustrate embodiments of the instant invention. Table 1 describes the various components of the compositions used in the present examples.

TABLE 1

| Component | Function in Formula | Chemical Descriptor | Supplier/ Manufacturer |
| --- | --- | --- | --- |
| Oligomer A | Urethane acrylate oligomer | See table 2 | DSM Desotech |
| CN-110 | Acrylate diluent monomer | Bisphenol A diacrylate | Sartomer |
| DVE-3 | Component possessing an electron-donating substituent attached to a vinyl group | Triethyleneglycol divinyl ether | BASF |

TABLE 1-continued

| Component | Function in Formula | Chemical Descriptor | Supplier/Manufacturer |
|---|---|---|---|
| Miramer 204 or SR213 (BDDA) | Acrylate diluent monomer | Butanediol diacrylate | Miwon or Sartomer |
| Irganox 1035 | Additive | Hindered phenol antioxidant | BASF |
| DC-190 | Additive | silicone slip agent | Dow Corning |
| DC-57 | Additive | silicone slip agent | Dow Corning |
| Irgacure 819 | Free-radical photoinitiator | phenylbis (2,4,6-trimethylbenzoyl)-phosphine oxide | BASF |
| Chivacure TPO | Free-radical photoinitiator | 2,4,6-Trimethylbenzoyl-di-phenylphosphinoxide | Chitech |
| Irgacure 184 | Free-radical photoinitiator | 1-hydroxycyclohexyl phenyl ketone | BASF |
| ITX | Photosensitizer | 2-isopropylthioxanthone | Chitec |

TABLE 2

Composition of Oligomer A by weight %

| Component | Description | Weight % |
|---|---|---|
| TDI-80 | touluene diisocyanate 80/20 | 21.25 |
| BHT | 3,5-Di-tert-butyl-4-hydroxytoluene | 0.10 |
| HEA | 2 hyrdoxy ethyl acrylate | 14.17 |
| DBTDL | dibutyl tin dilaurate | 0.05 |
| Pluracol P1010 | polypropylene glycol nominal 1000 mol. Wt. | 64.43 |
| Total | | 100.00 |

Test Methodology

Process to Make Polyurethane Diacrylate Oligomer A

To create oligomer A, all components are used in the ratios specified in Table 2, supra. A 500 mL four-necked and dry flask was charged with 63.75 g of toluene diisocyanate 80/20 and 0.30 g of stabilizer (BHT) to a reactor, and maintained at ambient temperature while stirring under dry air. Next, 42.51 g of 2-Hydroxy ethoxyl acrylate (HEA) was added. Then, the reactive endcapper (HEA) was metered-in at such a rate so as to limit the reaction temperature to less than 60° C., stir for one hour. Next, 193.29 g of Pluracol P1010 was added, and finally the catalyst 0.15 g of dibutyl tin dilaurate was added. After observing the initial rise in temperature due to the corresponding exothermic reaction, the solution was brought to 80° C., whereupon that temperature was maintained for about two hours. Next, the presence of unreacted isocyanate groups (NCO) was measured once an hour until the amount of unreacted isocyanate groups was less than 0.10%.

Preparation of LED Curable, Optical Fiber Secondary Coating Compositions

The compositions were created by combining their applicable constituents, then heated to about 60° C. and mixed to form homogeneous mixtures.

LED-DSC Method

A method of LED-DSC is described below using a photo-DSC equipped with a LED lamp to cure coating samples for cure degree measurements. As coating processes utilizing monochromatic light sources (such as LEDs) are more prone to oxygen inhibition, the surface cure degree is particularly sensitive to the $O_2$ content in the $N_2$ purged air condition during the cure. The commonly used conveyer belt equipment for preparing regular film samples suffers from large variations on surface cure due to the difficulty of precisely controlling the $O_2$ content in the associated open environment. The LED-DSC method as described below utilizing a photo-DSC equipment is superior in this respect in that it provides much better control with regards to atmospheric conditions in the sample chamber. This results in coating surface cure degree data wither levels of accuracy, repeatability and reproducibility.

Preparation of the Cured Film Samples from the LED-DSC Unit:

from about 1.3 to about 1.7 mg of each sample was dropped at the center of a T130522 DSC Tzero pan. The pan was then moved onto the sample plate of a Q2000 DSC unit from TA Instruments. A lamp holder for the DSC unit was customized and built according to well-known methods from Somos® NanoTool stereolithography resin in order to ensure proper fit of an Accucure ULM-2-395 model LED lamp from Digital Light Labs. The included LED external shutter was automatically triggered by connecting the "Event" outlet of the DSC to an Accure Photo Rheometer Ultraviolet Illumination & Measurement System.

Each liquid sample was gradually and uniformly wetted out to establish a film with a thickness of about 60 microns in the pan. These films were then cured by the LED lamp. The intensity of light and exposure time could be adjusted by the Accure Photo Rheometer Ultraviolet Illumination & Measurement System, while the curing temperature and $N_2$ flow rate could be adjusted by the DSC unit. Under an $N_2$ flow rate of approximately 50 mL/min, each sample was equilibrated at about 50° C. and isothermalized for approximately 5 mins, after which a 395 nm LED lamp with an intensity of about 50 mW/cm$^2$ was illuminated and remained on for about 6 seconds. The cured film was then carefully peeled off from the bottom of Tzero pan. Finally, the surface and bottom of the cured film were measured and the conversion was calculated as per the FTIR test method described herein.

Measurement of Surface and Bottom Cure of Film Samples by FTIR:

The surface of the cured film was measured using a Nicolet 4700 FTIR Spectrometer from Thermo Electron Corp. Measurements were taken at the area under the reference peak from about 1485 cm$^{-1}$ to about 1570 cm$^{-1}$; the acrylate peak at 1407 cm$^{-1}$ was also measured. Peak area is determined using the baseline technique where a baseline is chosen to be tangent to absorbance minima on either side of the peak. The area under the peak and above the baseline is then determined. The integration limits for liquid and the cured sample are not identical but are similar, especially for the reference peak.

The ratio of the acrylate peak area to the reference peak were determined for both the liquid and the cured samples. Degree of cure, expressed as percent reacted acrylate unsaturation (% RAU), is calculated from the equation below:

% RAU=[($R_L$−$R_F$)×100]/$R_L$ where $R_L$ is the area ratio of the liquid sample and $R_F$ is the area ratio of the cured film.

The resulting coatings on film % RAU were tested using the FTIR method described as above, and shown in Table 3 below.

It should be noted that the % RAU of the film samples cured by the LED-DSC method is expected to be substantially lower than the actual secondary coating surface cure on fiber under typical fiber drawing conditions cured by LED lamps. First, this occurs because the LED lamps utilized in actual draw towers for coating optical fibers possess a significantly higher output intensity than the one used on LED-DSC unit. Also, the LED lamps which are custom-designed for fiber drawing processes are highly focused on small areas of an optical fiber therefore providing much higher irradiance than the lamp condition used in LED-DSC. However, the relative trend of % RAU results of the series of film samples as shown in Table 3 are expected to correlate well with the in-situ cure degree of coatings on fiber. The LED-DSC method is therefore a reliable laboratory test that can be used as an accurate proxy to predict the relative trend of secondary coating cure on fiber by typical fiber drawing processes equipped with LED lamps.

Tensile Properties of Cylindrical Rods

The tensile properties including modulus may be determined by use of any instrument suitable for providing a stress-strain curve of sample. Instruments suitable for this analysis include those manufactured by Instron, Inc., and include the Instron 5564. In determining the modulus of the cured coating compositions in accordance with the invention, a sample of the radiation-curable composition was formed into a rod using a cylindrical template. The rods were prepared by first filling an elastomeric clear silicone rubber tubing with the liquid coating. Next, the filled rods were placed on a glass plate covered with aluminum foil and then cured by a Fusion UV processor. The dose and irradiance were measured using a ILT490 Profiling Belt Radiometer from International Light Technologies that measures intensity and dose in the UVA/UVB wavelength range. The following test conditions were then applied: about 1.0 J/cm$^2$ from a 600 W/inch D lamp with an irradiance of approximately 8.2 W/cm$^2$, and an N$_2$ flow rate of roughly 8 ft$^3$/min.

After curing, the rod was recovered from the tubing by gently stretching the tube from the end of the rod and cutting off the empty portion of the tube with a razor blade. The end of the rod was then grasped using forceps and the tubing was slowly pulled from the rod.

The rod was then conditioned for 16-24 hours at 23±2° C. and a relative humidity of 50±5%, and then tested under the same conditions. For the tensile testing on the Instron machine, the crosshead speed was set at 1 inch/minute. The secant modulus was calculated at 2.5% elongation with a least squares fit of the slope of the stress-strain plot. The secant modulus results are shown in Table 3, infra.

Test Method for YI-E313 Measurement

Preparation of Film Samples for YI-E313 Measurements:

Each sample was drawn down on a 4"×5" glass plate (with a thickness of ⅛" or less) (available from Herb's Glass and Mirror), and the liquid drawdown films were cured while being purged with nitrogen gas. Curing was performed by utilizing a Phoseon RX Fireline™ 395 LED 8 W/cm$^2$ water cooled (via an AGT 1.7 kW chiller) lamp with a monochromatic output spectrum at the 380-420 nm range, a peak irradiance at about 395 nm, and an emitting window of 125 mm×20 mm. The belt speed on the conveyer unit (under the lamp) could be adjusted to give the appropriate dose, while the irradiance of the light at the sample surface could also be adjusted by altering the height of the lamp. The dose and irradiance were measured using a UV-T SD. Int. Phoseon Technology Radiometer that is designed to measure intensity, dose and temperature in the wavelength range of from 380-420 nm. The belt speed on the conveyer unit (under the lamp) was controlled to give the appropriate dose of 720 mJ/cm$^2$ for each pass while the intensity of the light was maintained at around 3.3 W/cm$^2$. The N$_2$ flow rate was about 8 ft$^3$/min. After 3 passes, the cured films were removed from the glass plate with a razor blade. The film thickness for each sample was measured with a calibrated micrometer at three different locations in the area of color measurement. The thickness of the film samples were in the range of 20±2 mils.

Test Method for Color Measurement of Films:

Color measurement for yellowness index was obtained at the specified time after cure as described in Table 1. The samples were stored at the ambient room condition of 23±5° C. under typical room fluorescence lamp lighting where the distance of the samples to the lamps on the ceiling is at least 2 meters. The measurements were performed by placing the reference standard white tile provided with the equipment as background tile (YI-E313 of the white reference standard tile was measured to be 3.2) behind the cured film that was peeled from glass plate, and measuring the front of the cured film as close to the center area as possible where the measurement was taken. Where indicated in Table 3 by a specific timed measurement after the initial cure, color measurement values were obtained at the noted time+/−1 minute. The yellowness index YI-E313 according to ASTM method E313 was then measured. bbThe average of three YI-E313 readings was recorded for each sample. Measurements were taken using a DataColor 650 Spectrophotometer, calibrated according to the manufacturer's specifications, under the following measurement conditions:

Large Area View (LAV)

Specular Component Included (SCI)

D65 Illuminant

UV filter included

10° Observer Angle

The resulting coatings on film YI-E313 were tested using the method described as above, and are shown in Table 3.

TABLE 3

| Composition | Description | Mw | Comp Ex S1 | Comp Ex S2 | Comp Ex S3 | Comp Ex S4 | Comp Ex S5 | Inv Ex S1 | Inv Ex S2 | Inv Ex S3 | Inv Ex S4 | Comp Ex S6 | Inv Ex S5 |
|---|---|---|---|---|---|---|---|---|---|---|---|---|---|
| Oligomer A | urethane acrylate oligomer | | 29.00 | 30.00 | 29.00 | 28.00 | 27.00 | 30.00 | 30.00 | 30.00 | 30.00 | 28.00 | 28.00 |

TABLE 3-continued

| Composition | Description | Mw | Comp Ex S1 | Comp Ex S2 | Comp Ex S3 | Comp Ex S4 | Comp Ex S5 | Inv Ex S1 | Inv Ex S2 | Inv Ex S3 | Inv Ex S4 | Comp Ex S6 | Inv Ex S5 |
|---|---|---|---|---|---|---|---|---|---|---|---|---|---|
| CN-110 | bisphenol A diacrylate | | 40.00 | 40.00 | 40.00 | 40.00 | 40.00 | 40.00 | 40.00 | 40.00 | 40.00 | 40.00 | 40.00 |
| DVE-3 | triethyleneglycol divinyl ether | 202.0 | | | | | | 5.00 | 10.00 | 15.00 | 20.00 | | 10.00 |
| Miramer 204 (BDDA) | Butanediol diacrylate | 198.0 | 27.00 | 27.00 | 27.00 | 27.00 | 27.00 | 22.00 | 17.00 | 12.00 | 7.00 | 27.00 | 17.00 |
| Irganox 1035 | hindered phenol antioxidant | | 0.50 | 0.50 | 0.50 | 0.50 | 0.50 | 0.50 | 0.50 | 0.50 | 0.50 | 0.50 | 0.50 |
| DC-190 | silicone slip agent | | 0.33 | 0.33 | 0.33 | 0.33 | 0.33 | 0.33 | 0.33 | 0.33 | 0.33 | 0.33 | 0.33 |
| DC-57 | silicone slip agent | | 0.17 | 0.17 | 0.17 | 0.17 | 0.17 | 0.17 | 0.17 | 0.17 | 0.17 | 0.17 | 0.17 |
| Irgacure 819 | phenylbis (2,4,6-trimethylbenzoyl)-phosphine oxide | | | 2.00 | 3.00 | 4.00 | 5.00 | 2.00 | 2.00 | 2.00 | 2.00 | | |
| Chivacure TPO | 2,4,6-Trimethylbenzoyl-di-phenylphosphinoxide | | 1.00 | | | | | | | | | 4.00 | 4.00 |
| Irgacure 184 | 1-hydroxycyclohexyl phenyl ketone | | 2.00 | | | | | | | | | | |
| ITX | mixture of 2- and 4-isopropyl-thioxanthone | | | | | | | | | | | | |
| Total (%) | | | 100 | 100 | 100 | 100 | 100 | 100 | 100 | 100 | 100 | 100 | 100 |
| Total C=C/100 g (mole) | | | 0.47 | 0.47 | 0.47 | 0.47 | 0.47 | 0.47 | 0.47 | 0.47 | 0.47 | 0.47 | 0.47 |
| C=C—COOR/100 g (mole) | | | 0.47 | 0.47 | 0.47 | 0.47 | 0.47 | 0.42 | 0.37 | 0.32 | 0.27 | 0.47 | 0.37 |
| C=C—OR/100 g (mole) | | | | | | | | 0.05 | 0.10 | 0.15 | 0.20 | | 0.10 |
| C=C—OR/C=COOR (per 100 g) | | | | | | | | 0.12 | 0.27 | 0.46 | 0.73 | | 0.27 |
| C=C—OR/C— total (per 100 g) | | | | | | | | 10.46 | 20.96 | 31.50 | 42.09 | | 21.07 |
| Film surface RAU (%) of DSC samples | | | 46.0 | 70.7 | 75.0 | 78.4 | 81.7 | 73.1 | 76.6 | 79.2 | 79.6 | 73.6 | 78.1 |
| Film bottom RAU (%) of DSC samples | | | 77.3 | 80.6 | 82.1 | 83.0 | 81.6 | 84.0 | 86.9 | 89.6 | 92.4 | 81.8 | 87.3 |
| Secant modulus (MPa) of rod samples | | | | 1227 | | 1270 | | 1194 | 1131 | 1008 | 837 | 1238 | 1203 |
| Yellowness Index (YI-E313) at 30-45 minutes after cure | | | 9.0 | 29.2 | 32.8 | 36.3 | 39.6 | 25.1 | 21.6 | 17.9 | 13.8 | 12.7 | 10.8 |
| YI-E313 at 5 minutes after cure | | | | 31.7 | | | | 28.4 | 25.3 | 21.1 | 17.4 | | |
| YI-E313 at 15 minutes after cure | | | | 30.3 | | | | 26.5 | 23.1 | 19.1 | 15.1 | | |
| YI-E313 at 30 minutes after cure | | | | 29.5 | | | | 25.4 | 21.9 | 18.0 | 14.0 | | |
| YI-E313 at 60 minutes after cure | | | | 28.8 | | | | 24.4 | 20.7 | 16.8 | 13.0 | | |
| YI-E313 at 24 hrs after cure | | | | 23.7 | | | | 17.4 | 14.3 | 11.5 | 9.0 | | |
| YI-E313 at 168 hrs after cure | | | | 19.8 | | | | 15.3 | 12.3 | 9.8 | 7.8 | | |

Discussion of Results

Figure 3A:
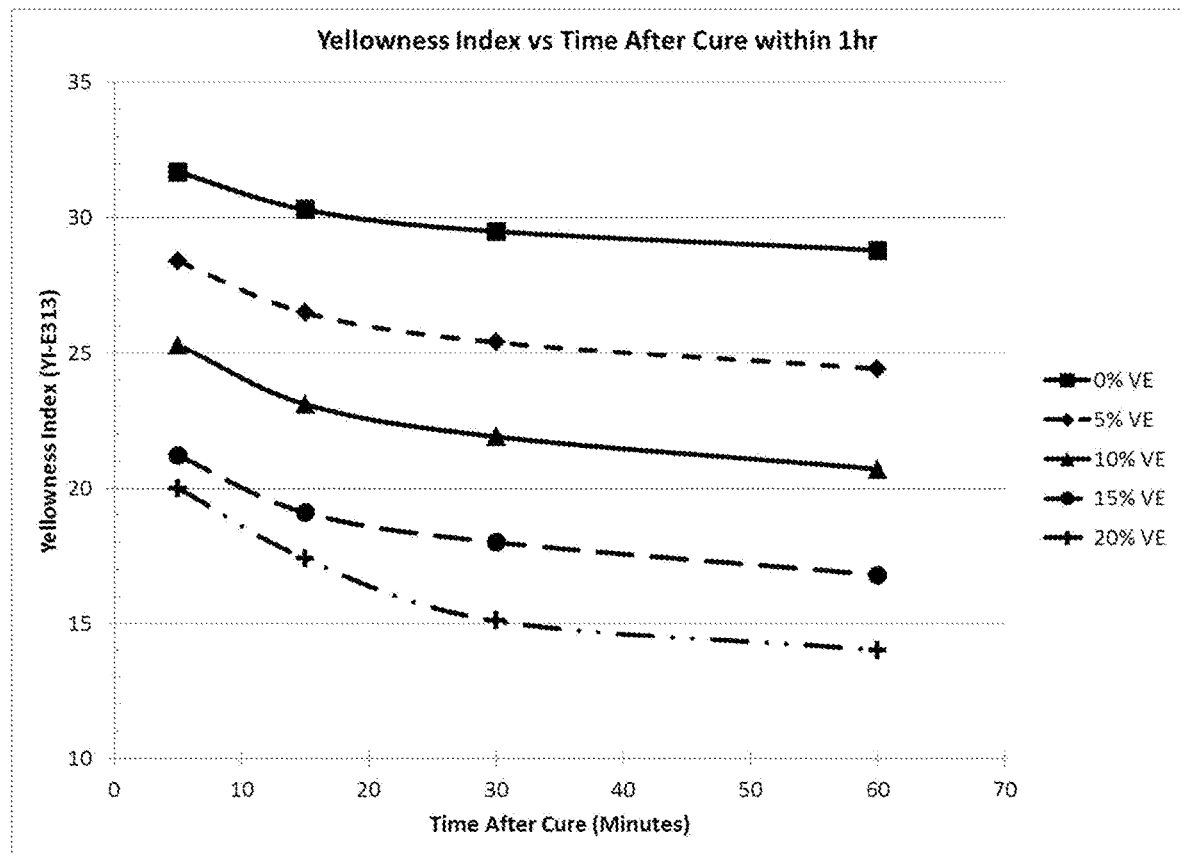
FIGS. 3($a$) and 3($b$) are a graphs illustrating the yellowness index of compositions containing varying amounts of a component possessing an electron-donating substituent attached to a vinyl group as a function of time after cure, within 1 hour shown in 3($a$), within 1 week shown in 3($b$).
Figure 3B:
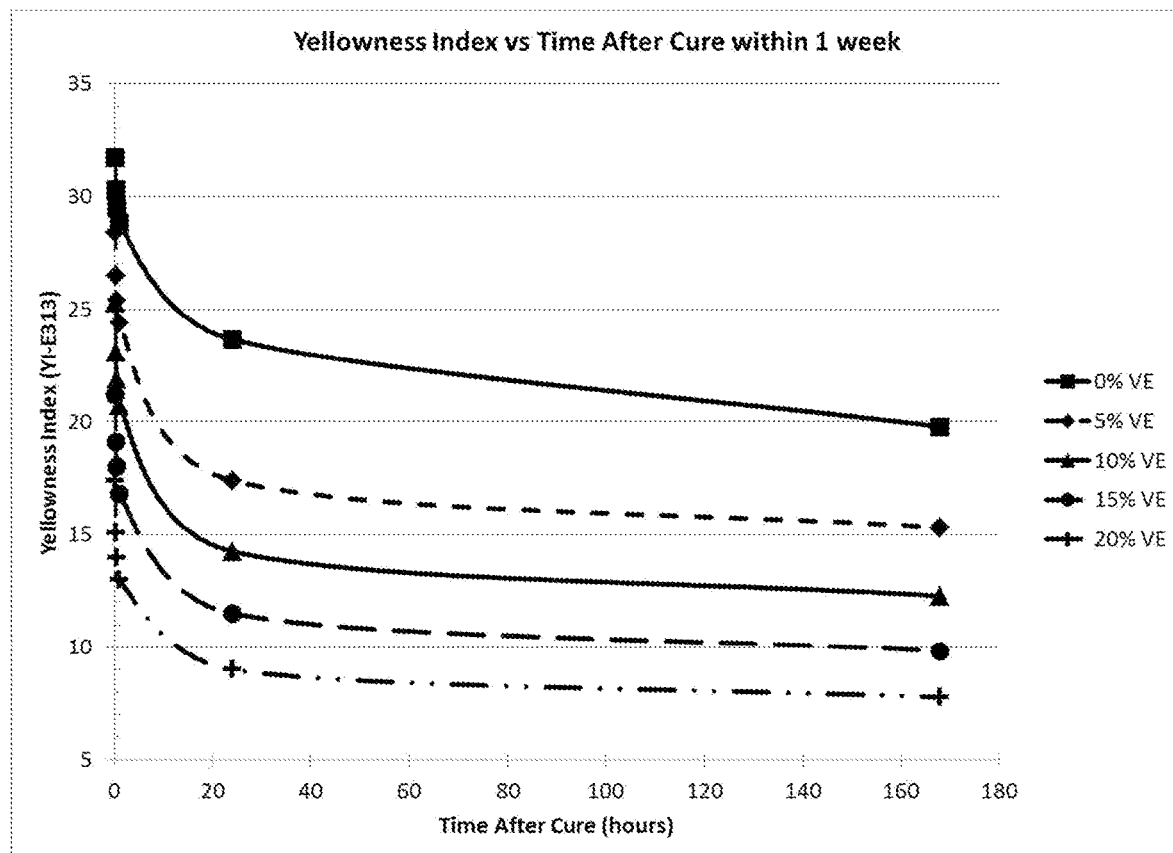

Surprisingly, the substitution of some of the acrylate monomer components with a component possessing an electron-donating substituent attached to a vinyl group allowed for the less constrained selection of photoinitiator(s), in turn enabling sufficient surface- and through-cure without also inducing unwanted yellowing. This can be readily seen in Table 3 above. Inventive examples S1 through S4 show increasing amounts of a component possessing an electron-donating substituent attached to an alkoxylated vinyl group, in this case triethyleneglycol divinyl ether, with the controlled total C=C double bond concentration as listed in Table 3 held the same as the control sample comparative example Ex S2. When compared with the control seen in comparative example Ex S2, it can be readily seen that increasing the amount of a component possessing an electron-donating substituent attached to a vinyl group concomitantly increases the surface cure, in this instance from about 71% to about 80%. Note, however, that these examples all use the same amounts of BAPO photoinitiator and yield a steadily decreasing amount of yellowness as shown by the yellowness index. Furthermore, when the yellowness index is measured at fixed time intervals after cure and is charted as depicted in FIGS. 3(a) and 3(b), it can be seen that the vinyl ether has a very surprising effect not only on reducing initial yellowing, but also seems to have a synergistic effect on substantially improving the photo bleaching effect typically associated with the BAPO photoinitiator. To the knowledge of the inventor, such an effect has never been seen before with a functionalized monomer. The outcome of this surprising effect, however, is that the BAPO photoinitiator can be used in higher amounts than would otherwise be expected possible, because of the constraint in the form of the typical high level of yellowing associated with its use.

Another effect, then, by using the electron-donating substituent attached to an alkoxylated vinyl group, is that one can now use the heretofore less suitable photoinitiators, such as MAPO, as demonstrated in inventive example S5. In that example, the surface cure is now at 78% and the yellowness index is much lower at 11. Note also that not only the surface cure of the inventive example S5 is higher than the comparative example Ex S6 which uses the MAPO photoinitiator without the inclusion of the alkoxylated vinyl ether monomer, the bottom cure in inventive example S5 is also higher than Ex S6 indicating better through cure as well. The BAPO photoinitiator can also be combined with the MAPO photoinitiator in the presence of the electron-donating substituent attached to a vinyl group monomer to achieve the optimal combination of surface cure, through cure (as measured by bottom cure), low yellowness, modulus, and Tg (as well as all of the other relevant properties considered desirable by a typical secondary optical fiber coating).

To summarize, inventors have surprisingly discovered that when combining the use of the non-yellowing photoinitiator, and optionally the yellow BAPO photoinitiator, with the component possessing an electron-donating substituent attached to an alkoxylated vinyl group, one can simultaneously achieve the desirable properties of high surface cure, high through cure, and low yellowness.

In the examples of table 3, the MAPO photoinitiator was used but is only one example of the non-yellowing class of photoinitiators that can now be used with the teachings herein. Furthermore, it is also contemplated that higher than normal levels of BAPO could be used—since the electron-donating substituent attached to a vinyl group significantly reduces the yellowing while allowing for the development of good surface and through cure. Such photoinitiators are well known in the art but some of the more preferred examples are discussed herein. Combinations are also contemplated and, indeed, given the wide range of rigorous targets to be achieved, are preferred.

Unless otherwise specified, the term wt. % means the amount by mass of a particular constituent relative to the entire liquid radiation curable composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described in detail and with reference to specific embodiments thereof, it will be apparent to one of ordinary skill in the art that various changes and modifications can be made therein without departing from the spirit and scope of the claimed invention.

What is claimed is:

1. A liquid radiation curable composition for coating an optical fiber comprising:
   (a) a component possessing an electron-donating substituent attached to a vinyl group, which is present in an amount from about 0.5 wt. % to about 20 wt. %, relative the total weight of the liquid radiation curable composition;
   (b) a (meth)acrylate oligomer;
   (c) a (meth)acrylate diluent monomer; and
   (d) a free-radical photoinitiator component;
      wherein component (a) comprises a multifunctional vinyl ether monomer; and
      wherein the composition is configured to attain a top surface percent reacted acrylate unsaturation (% RAU) of at least about 71% according to an LED DSC method, when said composition is cured by a source of monochromatic actinic radiation with a peak spectral output from about 355 nm to about 420 nm.

2. The liquid radiation curable composition for coating an optical fiber of claim 1, wherein the electron-donating substituent does not contain a nitrogen atom.

3. The liquid radiation curable composition for coating an optical fiber of claim 2, wherein the (meth)acrylate diluent monomer comprises N-substituted (meth)acrylamide, vinyl acetate, styrene, alkylstyrene, halostyrene, N-vinylpyrrolidone, N-vinyl caprolactam, vinyl chloride or vinylidene chloride.

4. The liquid radiation curable composition for coating an optical fiber of claim 2, wherein the component possessing an electron-donating substituent attached to a vinyl group consists of multifunctional vinyl ether monomers.

5. The liquid radiation curable composition for coating an optical fiber of claim 4, wherein the vinyl ether monomer is alkoxylated.

6. The liquid radiation curable composition for coating an optical fiber of claim 5, wherein the vinyl ether monomer is present in an amount, relative to the entire weight of the composition, of from about 0.5 wt. % to about 15 wt. %, and contains a backbone selected from the group consisting of an ethylene oxide, propylene oxide or butylene oxide.

7. The liquid radiation curable composition for coating an optical fiber of claim 2, wherein the free-radical photoinitiator component (d) has an average of not more than 12 conjugated double-bonds in any single molecule.

8. The liquid radiation curable composition for coating an optical fiber of claim 7, wherein the additive package further comprises a dye, colorant, or pigment.

9. The liquid radiation curable composition for coating an optical fiber of claim 8, wherein, relative to the entire weight of the composition,
the (meth)acrylate oligomer is present in an amount from 10 wt % to 90 wt %;
the (meth)acrylate diluent monomer is present in an amount from 10 wt % to 90 wt %;
the free-radical photoinitiator component is present in an amount from 0.1 wt % to 10 wt %;
and the dye, colorant, or pigment is present in an amount from 0 wt % to 10 wt % by dry weight.

10. The liquid radiation curable composition for coating an optical fiber of claim 9, wherein the a free-radical photoinitiator component (d) consists of a mono acyl phosphine oxide.

11. The liquid radiation curable composition for coating an optical fiber of claim 9, wherein the (meth)acrylate diluent monomer component (c) comprises ethylene glycol diacrylate, propylene glycol diacrylate, neopentyl glycol diacrylate, hexamethylene glycol diacrylate, bisphenol A diacrylate, 4,4'-bis(2-acryloyloxyethoxy)diphenylpropane, trimethylolpropane triacrylate, pentaerythritol triacrylate and tetraacrylate, vinyl acrylate, divinyl benzene, divinyl succinate, diallyl phthalate, triallyl phosphate, triallyl isocyanurate or tris(2-acryloylethyl)isocyanurate.

12. The liquid radiation curable composition for coating an optical fiber of claim 11, wherein the (meth)acrylate oligomer component (b) comprises a urethane acrylate oligomer comprising a backbone derived from a polyol which has been reacted with a diisocyanate and a hydoxyalkylacrylate.

13. The liquid radiation curable composition for coating an optical fiber of claim 1, wherein the source of monochromatic actinic radiation is one or more light emitting diodes (LEDs).

14. The liquid radiation curable composition for coating an optical fiber of claim 1, further comprising an additive package comprising:
from about 0 wt. % to about 2 wt. % of isopropylthioxanthone; and
from about 0 wt. % to about 3 wt. % of pentaerythritol tetra-3-mercaptopropionate.

15. The liquid radiation curable composition for coating an optical fiber of claim 1, wherein the composition is configured to attain a yellowness index of less than 30 within 45 minutes after curing.

16. The liquid radiation curable composition for coating an optical fiber of claim 15, wherein the composition is configured to attain a yellowness index of less than 20 within 45 minutes after curing.

17. The liquid radiation curable composition for coating an optical fiber of claim 16, wherein the composition is configured to attain a top surface percent reacted acrylate unsaturation (% RAU) of at least about 75%.

18. The liquid radiation curable composition for coating an optical fiber of claim 16, wherein the composition is configured to attain a top surface percent reacted acrylate unsaturation (% RAU) of at least about 80%.

19. The liquid radiation curable composition for coating an optical fiber of claim 16, wherein the composition is configured to attain a top surface percent reacted acrylate unsaturation (% RAU) from 75% to 85%.

20. The liquid radiation curable composition for coating an optical fiber of claim 15, wherein the composition is configured to attain a yellowness index of less than 12 within 45 minutes after curing.

* * * * *